US009512334B2

(12) United States Patent
Naganawa et al.

(10) Patent No.: US 9,512,334 B2
(45) Date of Patent: Dec. 6, 2016

(54) MODIFIED POLYSILAZANE FILM AND METHOD FOR PRODUCING GAS BARRIER FILM

(75) Inventors: Satoshi Naganawa, Tokyo (JP); Yuta Suzuki, Tokyo (JP)

(73) Assignee: LINTEC CORPORATION, Tokyo (JP)

(*) Notice: Subject to any disclaimer, the term of this patent is extended or adjusted under 35 U.S.C. 154(b) by 110 days.

(21) Appl. No.: 14/126,129

(22) PCT Filed: Jul. 12, 2012

(86) PCT No.: PCT/JP2012/067773

§ 371 (c)(1), (2), (4) Date: Dec. 13, 2013

(87) PCT Pub. No.: WO2013/035432

PCT Pub. Date: Mar. 14, 2013

(65) Prior Publication Data

US 2014/0199544 A1 Jul. 17, 2014

(30) Foreign Application Priority Data

Sep. 8, 2011 (JP) ................................ 2011-195623

(51) Int. Cl.

*C08J 7/18* (2006.01)
*C09D 183/16* (2006.01)

(Continued)

(52) U.S. Cl.

CPC ............... *C09D 183/16* (2013.01); *B05D 5/00* (2013.01); *C08J 7/042* (2013.01); *C08J 7/047* (2013.01);

(Continued)

(58) Field of Classification Search

CPC ................ H01J 2237/3365; H01J 2237/3382; H01J 2237/3385; H01J 2237/3387; B05D 5/00; C09J 183/16; C08J 7/047; C08J 7/123; C08J 7/18; C08J 2483/16

USPC ......................... 427/489, 527, 525, 529, 387

See application file for complete search history.

(56) References Cited

U.S. PATENT DOCUMENTS 6,617,052 B2 9/2003 Morii
6,692,326 B2 2/2004 Choi et al.

(Continued)

FOREIGN PATENT DOCUMENTS

CN 1575050 A 2/2005
EP 1484805 A2 12/2004

(Continued)

OTHER PUBLICATIONS

Webster's Ninth New Collegiate Dictionary; Merriam-Webster's incorporated, publishers; Springfield, Massachusetts, USA; 1990 (no month), excerpt p. 671.*

(Continued)

*Primary Examiner* — Marianne L Padgett

(74) *Attorney, Agent, or Firm* — Fitch, Even, Tabin & Flannery LLP

(57) ABSTRACT

Provided are a modified polysilazane film that is preferable as an intermediate material for forming a predetermined gas barrier film, and a method for producing a gas barrier film having excellent gas barrier properties using such modified polysilazane film as an intermediate material. A modified polysilazane film comprising a substrate and a modified polysilazane layer formed thereon, and a method for producing a gas barrier film obtained through such intermediate material, wherein the modified polysilazane layer has a thickness of a value in the range of 10 to 500 nm, and the modified polysilazane layer has a refractive index of a value in the range of 1.48 to 1.63.

14 Claims, 11 Drawing Sheets

(51) Int. Cl.

| | |
|---|---|
| ***C08J 7/12*** | (2006.01) |
| ***C08J 7/04*** | (2006.01) |
| ***B05D 5/00*** | (2006.01) |
| ***C09D 1/00*** | (2006.01) |

(52) U.S. Cl.

CPC .................. *C08J 7/123* (2013.01); *C09D 1/00* (2013.01); *C08J 2367/02* (2013.01); *C08J 2483/16* (2013.01); *H01J 2237/3365* (2013.01); *H01J 2237/3382* (2013.01); *H01J 2237/3385* (2013.01); *Y10T 428/265* (2015.01)

(56) References Cited

U.S. PATENT DOCUMENTS

| | | | | |
|---|---|---|---|---|
| 8,771,834 | B2 * | 7/2014 | Uemura | C08J 7/04 427/489 |
| 8,846,200 | B2 * | 9/2014 | Ito | C23C 14/48 427/489 |
| 8,906,492 | B2 * | 12/2014 | Suzuki | C08J 7/123 427/489 |
| 9,362,524 | B2 * | 6/2016 | Mori | B05D 1/60 |
| 9,365,922 | B2 * | 6/2016 | Hoshi | C23C 14/48 |
| 2002/0113241 | A1 | 8/2002 | Kubota et al. | |
| 2003/0003225 | A1 | 1/2003 | Choi et al. | |
| 2003/0129451 | A1 * | 7/2003 | Nukada | H01L 51/0035 428/690 |
| 2004/0081912 | A1 | 4/2004 | Nagahara et al. | |
| 2004/0247938 | A1 | 12/2004 | Yamaguchi et al. | |
| 2005/0100853 | A1 | 5/2005 | Tadros et al. | |
| 2007/0120108 | A1 | 5/2007 | Asabe | |
| 2008/0023442 | A1 * | 1/2008 | Ito | H01L 21/67253 216/58 |
| 2008/0199977 | A1 * | 8/2008 | Weigel | H01L 21/02126 438/4 |
| 2008/0319121 | A1 * | 12/2008 | Mitani | C08L 83/04 524/493 |
| 2010/0019654 | A1 | 1/2010 | Hayashi | |
| 2011/0041913 | A1 * | 2/2011 | Luecke et al. | 136/256 |
| 2011/0121270 | A1 | 5/2011 | Kim et al. | |
| 2012/0064321 | A1 | 3/2012 | Suzuki et al. | |
| 2012/0107607 | A1 * | 5/2012 | Takaki | C08J 7/047 428/336 |
| 2012/0241889 | A1 * | 9/2012 | Takemura | H01L 51/448 257/431 |
| 2012/0295120 | A1 | 11/2012 | Nagamoto et al. | |
| 2013/0047889 | A1 | 2/2013 | Iwaya et al. | |
| 2013/0068136 | A1 * | 3/2013 | Iwaya | C08K 3/346 106/286.8 |
| 2013/0202900 | A1 * | 8/2013 | Uemura | C08J 7/04 428/451 |
| 2013/0224503 | A1 * | 8/2013 | Suzuki | C23C 14/06 428/447 |
| 2013/0244044 | A1 * | 9/2013 | Ito | C23C 14/48 428/446 |
| 2014/0342149 | A1 * | 11/2014 | Naganawa | C23C 14/48 428/336 |
| 2014/0374665 | A1 * | 12/2014 | Iwaya | C08J 7/123 252/500 |
| 2015/0287954 | A1 * | 10/2015 | Naganawa | C08J 7/18 428/212 |
| 2015/0367602 | A1 | 12/2015 | Iwaya et al. | |

FOREIGN PATENT DOCUMENTS

| | | | | |
|---|---|---|---|---|
| EP | 2410005 | A1 | 1/2012 | |
| JP | 2001-171047 | A | 6/2001 | |
| JP | 2002-231443 | A | 8/2002 | |
| JP | 2007-59131 | A | 3/2007 | |
| JP | 2007-180014 | A | 7/2007 | |
| JP | 2007-237588 | | 9/2007 | |
| JP | 2008-71608 | A | 3/2008 | |
| JP | 2009-196155 | A | 9/2009 | |
| JP | 2010-27561 | A | 2/2010 | |
| JP | 2010-158832 | | 7/2010 | |
| JP | 2010-232569 | A | 10/2010 | |
| JP | 2011-26645 | | 2/2011 | |
| JP | 2011-36779 | A | 2/2011 | |
| JP | 2011-68042 | | 4/2011 | |
| JP | 2011-213847 | A | 10/2011 | |
| JP | 2011-213907 | A | 10/2011 | |
| JP | 2009-252574 | A | 12/2013 | |
| JP | 2011-68124 | A | 12/2013 | |
| WO | WO 2010/107018 | A1 | 9/2010 | |
| WO | WO 2011/007543 | A1 * | 1/2011 | B23B 9/00 |
| WO | WO 2011/043315 | A1 | 4/2011 | |
| WO | WO 2011/074440 | A1 * | 6/2011 | H01L 51/448 |
| WO | 2013108487 | A1 | 7/2013 | |
| WO | 2013125352 | A1 | 8/2013 | |

OTHER PUBLICATIONS

Richard J. Lewis, Sr., editor; Hawley's Condensed Chemical Dictionary; 12th edition; Van Reinhold Nostrand Company; New York; 1993 (no month); excerpt p. 680.*

Gelamo et al. "Infrared spectroscopy investigation of various plasma-deposited polymer films irradiated with 170 keV He+ ions"; Nuclear Instruments and Methods in Physics Research B; vol. 249; 2006 (available online May 12, 2006); pp. 162-166.*

J.C. Pivin et al., "Comparison of Ion Irradiation Effects in Silicon-Based Pre-ceramic Thin Films"; Journal American Ceramics Society; vol. 83 [4]; Apr. 2000; pp. 713-720.*

Optical constants of SiO2 (Silicon dioxide, Silica, Quartz); http://refractiveindex.info/?shelf=main&book=SiO2 &page=Malitson; viewed Aug. 24, 2016.

Supplementary European Search Report mailed Aug. 20, 2015, for European Application No. 12866013.1; 9 pages.

Supplementary European Search Report mailed Sep. 23, 2015, for European Application No. 13752126.6.

Office Action mailed May 31, 2016, for U.S. Appl. No. 14/367,252.

Office Action mailed Nov. 10, 2015, for U.S. Appl. No. 14/367,252.

Office Action mailed Jun. 1, 2016, for U.S. Appl. No. 14/378,687.

* cited by examiner

MODIFIED POLYSILAZANE FILM AND METHOD FOR PRODUCING GAS BARRIER FILM

BACKGROUND

Technical Field

The present invention relates to a modified polysilazane film and a method for producing a gas barrier film. Specifically, the present invention relates to a modified polysilazane film that is preferable as an intermediate material for forming a predetermined gas barrier film, and to a method for producing a gas barrier film using such modified polysilazane film as an intermediate material.

Related Art

A method for producing a gas barrier film that has excellent gas barrier properties and is produced within a short time, and the like have been suggested until now for the purpose of obtaining an alternative for a substrate used for glass for an organic EL element (for example, see Patent Document 1).

More specifically, it is a method for producing a gas barrier film comprising applying a perhydropolysilazane-containing solution onto at least one surface of a substrate, drying the solution by heating to give a polysilazane film, and subjecting the polysilazane film to a plasma treatment at an ordinary pressure or a vacuum plasma treatment.

The document describes that this gas barrier film has a thickness of 0.01 to 5 μm and a water vapor transmission rate of 1 g/(m$^2$·day) or less.

Furthermore, a method for producing a gas barrier film having a silicon oxide thin film having extremely high gas barrier properties is suggested, for the purpose of applying the gas barrier film to a resin substrate used for an organic photoelectric conversion element (for example, see Patent Document 2).

More specifically, a method for producing a gas barrier film comprising applying a silicon-containing liquid onto at least one surface of a substrate, drying the liquid at 20 to 120° C. to form a silicon thin film, and forming a silicon oxide thin film on the silicon thin film by a plasma CVD process using a reactive gas containing an organic silicon compound and oxygen.

Furthermore, a gas barrier film having a carbon-containing silicon oxide film having excellent transparency without decrease in the gas barrier properties is suggested (for example, see Patent Document 3).

More specifically, it is a gas barrier film having a substrate film and a carbon-containing silicon oxide film having a film thickness of 5 to 300 nm formed on at least one surface of the substrate film, wherein the carbon-containing silicon oxide film has a composition ratio (C/Si) of the carbon atom (C) and silicon atom (Si) in the range of more than 0 and 1 or less and also has a yellowness index (YI) in the range of 1.0 to 5.0.

CITATION LIST

Patent Documents

[Patent Document 1] JP2007237588A
[Patent Document 2] JP201126645A
[Patent Document 3] JP2010158832A

SUMMARY

However, according to the method for producing a gas barrier film disclosed in Patent Document 1, although the polysilazane film is subjected to a plasma treatment at an ordinary pressure or a vacuum plasma treatment, the polysilazane film before the plasma treatment is not considered at all, and thus a problem that the obtained gas barrier properties significantly vary is observed.

Furthermore, according to the method for producing a gas barrier film disclosed in Patent Document 2, it is necessary to form an additional silicon oxide thin film by a plasma CVD process on a predetermined silicon thin film (a polysilazane film or the like).

Therefore, a problem that thinning and continuous film formation of the gas barrier film are difficult, or that the adhesion between the silicon thin film as a primer and the silicon oxide thin film formed by the plasma CVD process is poor, is observed.

Furthermore, according to the gas barrier film disclosed in Patent Document 3, problems that the gas barrier properties are still low, the gas barrier properties vary, and the durability and the like are poor, are observed.

Therefore, the inventors of the invention did intensive studies, and consequently found that the refractive index and the like of a modified polysilazane layer in a modified polysilazane film affect the various properties of a finally-obtained gas barrier film and completed the present invention.

Specifically, an object of the present invention is to provide a modified polysilazane film that can stably provide excellent gas barrier properties such as a low water vapor transmission rate even at a predetermined thickness.

Furthermore, another object of the present invention is to provide a method for producing a gas barrier film, which can effectively provide a gas barrier film having excellent gas barrier properties even at a predetermined thickness, through such modified polysilazane film.

According to the present invention, a modified polysilazane film comprising a substrate and a modified polysilazane layer formed thereon, wherein the modified polysilazane layer has a thickness of a value in the range of 10 to 500 nm, and the modified polysilazane layer has a refractive index of a value in the range of 1.48 to 1.63 is provided, and thus the above-mentioned problems can be resolved.

Specifically, a gas barrier film having excellent gas barrier properties can be obtained in the case when a gas barrier layer is formed by a plasma ion implantation process, by forming a modified polysilazane layer in a modified polysilazane film for obtaining a gas barrier material into a film-like shape having a predetermined thickness, and by adjusting the refractive index to a value within a predetermined range.

Furthermore, in the constitution of the modified polysilazane film of the present invention, it is preferable that the modified polysilazane layer has a nitrogen amount measured by XPS (X-ray photoelectron spectroscopy) of a value in the range of 7 to 50 mol % with respect to the overall amount (100 mol %), wherein the overall amount is the total amount of the silicon amount, oxygen amount and nitrogen amount.

By constituting in such way, the refractive index of the modified polysilazane layer is easily controlled, and a gas barrier film having excellent gas barrier properties and transparency can be obtained when the modified polysilazane film is formed into a gas barrier layer by a plasma ion implantation process.

Furthermore, in the constitution of the modified polysilazane film of the present invention, it is preferable that the modified polysilazane layer has an oxygen amount measured by XPS of a value in the range of 0.1 to 58 mol % with respect to the overall amount (100 mol %), wherein the overall amount is the total amount of the silicon amount, oxygen amount and nitrogen amount.

By constituting in such way, the refractive index of the modified polysilazane layer is easily controlled, and a gas barrier film having excellent gas barrier properties and flexibility can be obtained when the modified polysilazane film is formed into a gas barrier film by a plasma ion implantation process.

Furthermore, in the constitution of the modified polysilazane film of the present invention, it is preferable that the modified polysilazane layer has a silicon amount measured by XPS of a value in the range of 34 to 50 mol % with respect to the overall amount (100 mol %), wherein the overall amount is the total amount of the silicon amount, oxygen amount and nitrogen amount.

By constituting in such way, the refractive index of the modified polysilazane layer is easily controlled, and a gas barrier film having excellent gas barrier properties and mechanical properties can be obtained when the modified polysilazane film is formed into a gas barrier film by a plasma ion implantation process.

Furthermore, in the constitution of the modified polysilazane film of the present invention, it is preferable that the modified polysilazane layer is formed by heat-treating the polysilazane layer formed on the substrate.

By constituting in such way, the refractive index of the modified polysilazane layer is easily controlled, and a gas barrier film having excellent gas barrier properties and mechanical properties can be obtained when a gas barrier layer is obtained by a plasma ion implantation process.

Furthermore, in the constitution of the modified polysilazane film of the present invention, it is preferable that the polysilazane layer contains a perhydropolysilazane as a polysilazane compound.

By constituting in such way, the refractive index of the modified polysilazane layer is easily controlled, and a gas barrier film having excellent gas barrier properties and mechanical properties can be obtained when the modified polysilazane film is formed into a gas barrier film by a plasma ion implantation process.

Furthermore, in the constitution of the modified polysilazane film of the present invention, the modified polysilazane film is preferably an intermediate material for obtaining a gas barrier film comprising a substrate and a gas barrier layer formed thereon, by forming the modified polysilazane layer into the gas barrier layer by a plasma ion implantation process into the modified polysilazane layer.

By constituting in such way, a gas barrier film having further excellent gas barrier properties and mechanical properties can be obtained.

In the present invention, the three terms of "polysilazane layer", "modified polysilazane layer" and "gas barrier layer" are used, and the mutual relationship thereof is as follows.

Specifically, the relationship is such that the "polysilazane layer" is changed to the "modified polysilazane layer" through the intermediate treatment step mentioned below, and such "modified polysilazane layer" is changed to the "gas barrier layer" that exerts a predetermined gas barrier effect and the like, for example, through the plasma ion implantation step mentioned below.

Therefore, in the following, a polysilazane film comprising the substrate and the "polysilazane layer" formed thereon is sometimes referred to as "starting material"; a modified polysilazane film comprising the substrate and the "modified polysilazane layer" formed thereon is sometimes referred to as "intermediate material"; and a gas barrier film comprising the substrate and the "gas barrier film" formed thereon is sometimes referred to as "final article".

Furthermore, another aspect of the present invention is a method for producing a gas barrier film using a modified polysilazane film comprising a substrate and a modified polysilazane layer formed thereon, comprising the following steps (1) to (3).

(1) a polysilazane layer forming step, comprising forming a polysilazane layer on a substrate;
(2) an intermediate treatment step, comprising heat-treating the obtained polysilazane layer to form a modified polysilazane layer having a thickness of a value in the range of 10 to 500 nm and a refractive index of a value in the range of 1.48 to 1.63 to thereby give a modified polysilazane film as an intermediate material;
(3) a plasma ion implantation step, comprising conducting a plasma ion implantation process into the modified polysilazane layer of the obtained modified polysilazane film to form the modified polysilazane layer into a gas barrier layer to thereby give a gas barrier film comprising the substrate and the gas barrier layer formed thereon.

Specifically, a gas barrier film having excellent gas barrier properties can be obtained in the case when (1) the polysilazane layer formed in the polysilazane layer forming step is (2) formed into a modified polysilazane layer having predetermined thickness and refractive index in the intermediate treatment step, and (3) the modified polysilazane layer is formed into a gas barrier layer by a plasma ion implantation process in the plasma ion implantation step.

Furthermore, in carrying out the method for producing a gas barrier film of the present invention, as the conditions for the heat treatment of the polysilazane layer in the step (2), it is preferable that the heating temperature is a value in the range of 60° C. to 140° C., and the heat treatment time is a value in the range of 30 seconds to 60 minutes.

By carrying out in such way, a modified polysilazane layer having a predetermined refractive index can be easily obtained, and consequently, a gas barrier film having excellent gas barrier properties can be obtained in the step (3).

Furthermore, as long as the conditions for the heat treatment are such ones, an extremely excellent gas barrier film can be stably obtained through the step (3) without damaging the substrate and the like for forming the modified polysilazane layer.

Furthermore, it is preferable to use oxygen, nitrogen, helium, argon, neon or krypton as the plasma ion in the step (3) in carrying out the method for producing a gas barrier film of the present invention.

By carrying out in such way, in the case when the modified polysilazane layer is formed into a gas barrier layer by a plasma ion implantation process, a gas barrier film having more excellent gas barrier properties can be obtained.

DETAILED DESCRIPTION

[First Embodiment]

Figure 1:
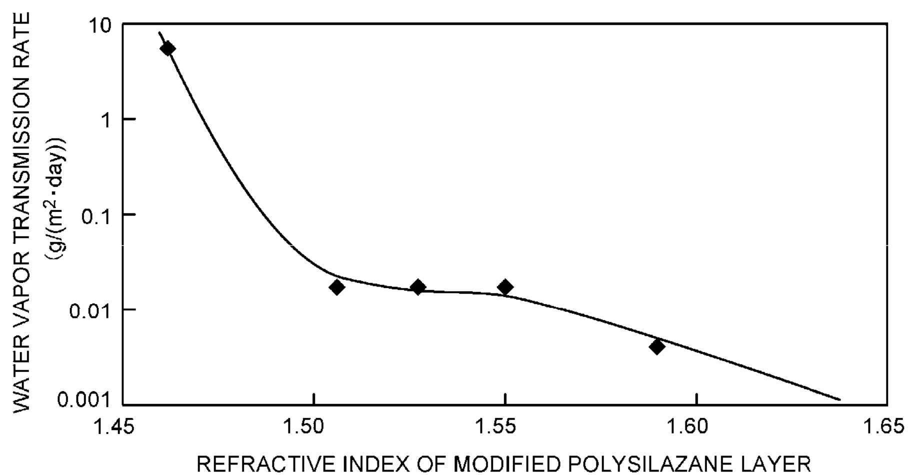
FIG. 1 is a drawing provided for explaining the relationship between the refractive index of the modified polysilazane layer and the water vapor transmission rate (g/($m^2$·day)) of the obtained gas barrier film.

The first embodiment is a modified polysilazane film comprising a substrate and a modified polysilazane layer formed thereon, wherein the modified polysilazane layer has a thickness of a value in the range of 10 to 500 nm, and the modified polysilazane layer has a refractive index of a value in the range of 1.48 to 1.63.

Specifically, a gas barrier film having excellent gas barrier properties can be obtained in the case when the modified polysilazane film is formed into a gas barrier layer by a plasma ion implantation process, by adjusting the modified polysilazane layer in the modified polysilazane film to have a predetermined thickness, and adjusting the refractive index of the modified polysilazane layer to a value within a predetermined range.

Hereinafter the modified polysilazane film of the first embodiment will be specifically explained with suitably referring to the drawings.

1. Modified Polysilazane Layer (1) Thickness

The modified polysilazane layer in the present invention has a thickness of a value in the range of 10 to 500 nm.

The reason is that a gas barrier film whose refractive index is easily controlled, which can be stably formed, and therefore has excellent gas barrier properties and transparency (total light transmittance) can be obtained by adjusting the thickness to such range.

Furthermore, when the modified polysilazane layer having such thickness is formed into a gas barrier layer, the flexibility is excellent and the adhesion to the substrate is fine.

To be specific, when such modified polysilazane layer has a thickness of a value of less than 10 nm, it is sometimes difficult to control the thickness to an even thickness, and it is sometimes difficult to control the refractive index. Furthermore, in the case when a gas barrier film is obtained by using such modified polysilazane layer as a gas barrier layer, the gas barrier properties sometimes become insufficient since the mechanical strength of the gas barrier film is decreased, or the water vapor transmission rate is increased.

On the other hand, when such modified polysilazane layer has a thickness of a value of more than 500 nm, the refractive index is sometimes difficult to control. Furthermore, in the case when a gas barrier film is obtained by using such modified polysilazane layer as a gas barrier layer, the flexibility of the gas barrier film may be excessively decreased, or the adhesion between the gas barrier layer and the substrate, transparency and the like may be excessively decreased.

Therefore, the thickness of the modified polysilazane layer is more preferably a value in the range of 20 to 300 nm, further preferably a value in the range of 30 to 200 nm.

The modified polysilazane layer having such thickness is formed by the change of the "polysilazane layer" through a predetermined intermediate treatment, and is further changed to "gas barrier layer" by undergoing a predetermined step. That the modified polysilazane layer is formed by heat-treating the polysilazane layer formed on the substrate and that the gas barrier layer is formed by carrying out a plasma ion implantation process into the modified polysilazane layer will be specifically explained in the second embodiment mentioned below.

(2) Refractive Index

The modified polysilazane layer has a refractive index of a value in the range of 1.48 to 1.63.

The reason is that, in the case when a gas barrier layer is formed by a plasma ion implantation process, a gas barrier film having excellent gas barrier properties (water vapor transmission rate and the like) and transparency (total light transmittance) can be obtained by limiting such refractive index to a value in a predetermined range.

More specifically, the reason is that, when the refractive index of such modified polysilazane layer becomes a value of less than 1.48, the values of the water vapor transmission rate and oxygen transmission rate when the modified polysilazane layer is formed into a gas barrier film may become excessively high.

On the other hand, when the refractive index of such modified polysilazane layer becomes a value more than 1.63, the transparency (total light transmittance) when the modified polysilazane layer is formed into a gas barrier film may excessively decrease, or the gas barrier film may be colored.

Therefore, the modified polysilazane layer has a refractive index of, more preferably a value in the range of 1.49 to 1.59, further preferably a value in the range of 1.50 to 1.58.

Figure 2:
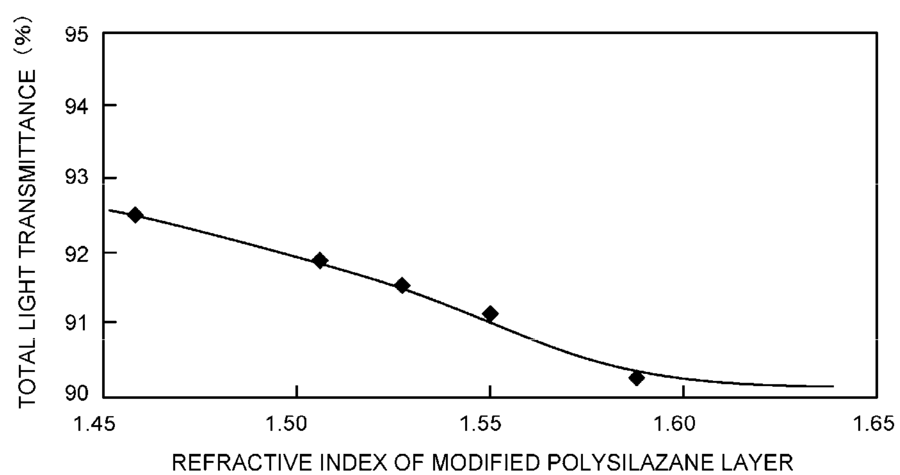
FIG. 2 is a drawing provided for explaining the relationship between the refractive index of the modified polysilazane layer and the total light transmittance (%) of the obtained gas barrier film.
Figure 3:
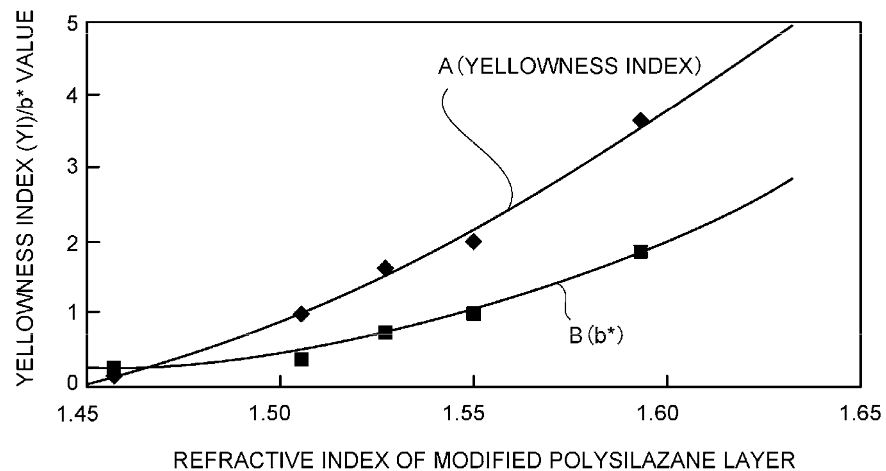
FIG. 3 is a drawing provided for explaining the relationship between the refractive index of the modified polysilazane layer and the yellowness index (YI) and b* value of the obtained gas barrier film.

FIGS. 1 to 3 show the respective effects of the refractive index of the modified polysilazane layer on the water vapor transmission rate (g/($m^2$·day)) and total light transmittance (%), and on the yellowness index (YI) in the CIE1976L*a*b* color system and the b* value in the CIE1976L*a*b* color system, in the gas barrier film.

The definitions and measurement methods for such water vapor transmission rate (g/($m^2$·day)) and total light transmittance (%), and the yellowness index (YI) and b* value in the CIE chromaticity coordinate will be explained in detail in Example 1 mentioned below.

Specifically, in FIG. 1, the horizontal axis shows the values of the refractive indices of the modified polysilazane layer, and the vertical axis shows the values of the water vapor transmission rates (g/($m^2$·day)) of the gas barrier films obtained by a plasma ion implantation process (corresponding to Examples 1 to 4 and Comparative Example 1 mentioned below).

In the present invention, whether or not the obtained gas barrier film has excellent gas barrier properties can be confirmed by the water vapor transmission rate of the gas barrier film.

More specifically, the obtained gas barrier film has a water vapor transmission rate of, preferably a value of 0.5 g/($m^2$·day) or less, more preferably a value of 0.1 g/($m^2$·day) or less, under an atmosphere at 40° C. and 90% RH.

As shown by the characteristic curve in such FIG. 1, a tendency that the value of the water vapor transmission rate in the gas barrier film increases as the value of the refractive index of the modified polysilazane layer decreases, i.e., the gas barrier properties decrease, was observed.

More specifically, when the refractive index of the modified polysilazane layer is a value of less than 1.48, the water vapor transmission rate is a value of 0.5 g/($m^2$·day) or more.

Similarly, when such refractive index is about 1.5, the water vapor transmission rate is approximately 0.02 g/($m^2$·day), when such refractive index is about 1.50 to 1.55, the water vapor transmission rate is approximately 0.02 g/($m^2$·day), and when such refractive index is about 1.59, the water vapor transmission rate is approximately 0.003 g/($m^2$·day).

Therefore, it is understood that the refractive index of the modified polysilazane layer closely involves in the water vapor transmission rate of the gas barrier film.

Specifically, by controlling the value of the refractive index of the modified polysilazane layer to be within the above-mentioned predetermined range, the water vapor transmission rate of the gas barrier film can be controlled to be a desired value to thereby give a gas barrier film having excellent gas barrier properties.

In FIG. 2, the horizontal axis shows the values of the refractive indices of the modified polysilazane layer, and the vertical axis shows the values of the total light transmittances (%) of the gas barrier films obtained by a plasma ion implantation process (corresponding to Examples 1 to 4 and Comparative Example 1 mentioned below).

In the present invention, whether or not the obtained gas barrier film has excellent transparency can be confirmed by the total light transmittance of the gas barrier film.

More specifically, the obtained gas barrier film has a total light transmittance of preferably 85% or more, preferably 90% or more.

As shown by the characteristic curve in such FIG. 2, a tendency that the value of the total light transmittance (%), which is an index showing the transparency, increases as the value of the refractive index of the modified polysilazane layer decreases was observed.

More specifically, when the refractive index of the modified polysilazane layer is a value of less than 1.48, the total light transmittance is a value of 92.5% or more.

Similarly, when such refractive index is about 1.50, the total light transmittance is a value of approximately 92%, and when such refractive index is about 1.59, the total light transmittance is a value of approximately 90%.

Therefore, it is understood that the refractive index of the modified polysilazane layer closely involves in the total light transmittance of the gas barrier film.

Specifically, by controlling the value of the refractive index of the modified polysilazane layer to be within the above-mentioned predetermined range, the total light transmittance of the gas barrier film can be controlled to a value in the desired range to thereby give a gas barrier film having excellent gas barrier properties.

In FIG. 3, the horizontal axis shows the values of the refractive indices of the modified polysilazane layer, and the vertical axis shows the values of the yellowness indices in the CIE1976L*a*b* color system (YI, hereinafter sometimes simply referred to as yellowness indices) (characteristic curve A in FIG. 3) and the values of b* in the CIE1976L*a*b* color system (characteristic curve B in FIG. 3) in the gas barrier films obtained by a plasma ion implantation process (corresponding to Examples 1 to 4 and Comparative Example 1 mentioned below).

As shown by such characteristic curves A and B in FIG. 3, a tendency that the yellowness index and the value of b* in the gas barrier film proportionally decrease as the value of the refractive index of the modified polysilazane layer decreases, i.e., the gas barrier film becomes hard to be colored and has a lighter yellow-based color, was observed.

More specifically, when the refractive index of the modified polysilazane layer is a value of lower than 1.48, the values of the yellowness index and b* are about 0.3 and about 0.1, respectively. Specifically, it can be said that the gas barrier film is colored little.

Similarly, when such refractive index is about 1.50, the values of the yellowness index and b* are about 1 and about 0.5, respectively. Therefore, it can be considered that the gas barrier film is slightly colored.

Similarly, when such refractive index is about 1.59, the values of the yellowness index and b* becomes about 3.5 and about 2.0, respectively. Therefore, it can be considered that the gas barrier film is colored.

Therefore, it is understood that the refractive index of the modified polysilazane layer closely involves in the yellowness index and b* value, which are indices showing the coloring property and the like in the gas barrier film.

Specifically, it is understood that the coloring property in the gas barrier film can be controlled by controlling the value of the refractive index of the modified polysilazane layer to be within the above-mentioned predetermined range.

(3) XPS Analysis

Furthermore, it is preferable that the silicon amount (Si), oxygen amount (O) and nitrogen amount (N) measured by XPS (X-ray photoelectron spectroscopy) are in the following incorporation ratio when the total amount of the silicon amount (Si), oxygen amount (O) and nitrogen amount (N) is defined as the overall amount (100 mol %) in the modified polysilazane layer.

When the modified polysilazane layer contains elements other than the three components of silicon, oxygen and nitrogen (for example, hydrogen, carbon, argon and the like) as excess components, the incorporation ratio is calculated by excluding these elements and setting the total amount of the above-mentioned three components as 100 mol %.

In essence, each of the silicon amount (Si), oxygen amount (O) and nitrogen amount (N) in the modified polysilazane layer can be a value obtained by arbitrary choosing three measurement points in the planar direction of the modified polysilazane layer, measuring the amounts of the element in the total depth direction on the respective measurement points by XPS, and averaging the values.

However, it was experientially confirmed that, when the thickness of the modified polysilazane layer is more than 60 nm, approximately similar amounts of elements to those measured in the total depth direction can be obtained by measuring the amounts of elements from the surface to 60 nm in the depth direction.

Therefore, in the case when the thickness of the modified polysilazane layer is more than 60 nm, the amounts of elements to 60 nm in the depth direction can be measured and used as the amounts of elements in the present invention.

(3)-1 Silicon Amount

The silicon amount (Si) measured by XPS is preferably a value in the range of 34 to 50 mol % with respect to the overall amount (100 mol %), wherein the overall amount is the total amount of the silicon amount (Si), oxygen amount (0) and nitrogen amount (N).

The reason is that the refractive index can be within the above-mentioned predetermined range by controlling the silicon amount in such way.

Furthermore, in the case when a gas barrier layer is formed by a plasma ion implantation process, a gas barrier film having more excellent gas barrier properties can be obtained.

Next, the relationship between the refractive index of the modified polysilazane layer and the silicon amount will be explained by using FIG. 4.

Figure 4:
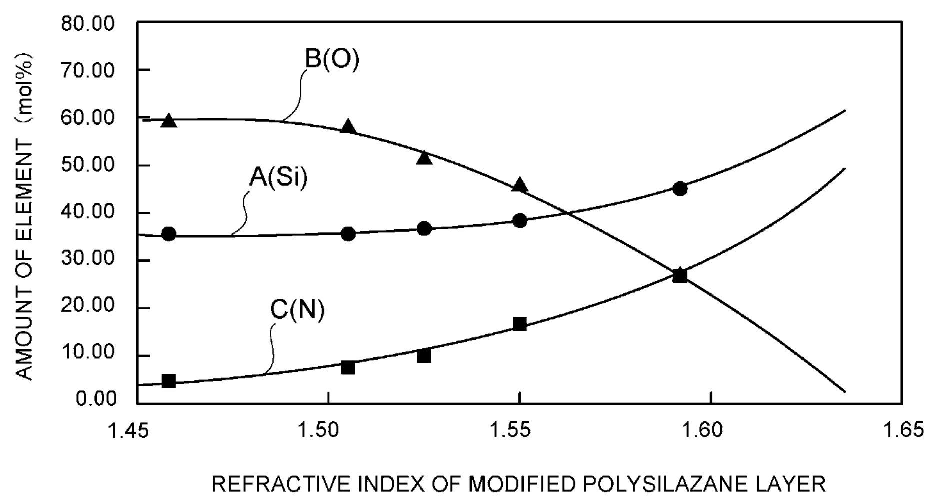
FIG. 4 is a drawing provided for explaining the relationships between the refractive index of the modified polysilazane layer and the amounts of elements (silicon amount, nitrogen amount and oxygen amount) measured by XPS, respectively.

Specifically, FIG. 4 shows characteristic curves A, B and C, in which the horizontal axis shows the refractive indices of the modified polysilazane layer and the vertical axis shows the silicon amount, oxygen amount and nitrogen amount in the modified polysilazane layer measured by XPS, respectively.

The modified polysilazane layers used in the measurements correspond to Examples 1 to 4 and Comparative Example 1 mentioned below, and each amount of element is an average value of the amounts of the element from the surface of the modified polysilazane layer to 60 nm toward the depth direction.

It is understood from characteristic curve A shown in FIG. 4 that, when the silicon amount is a value in the range of 34 to 50 mol %, the refractive index of the modified polysilazane layer significantly depends on the oxygen amount and nitrogen amount at that time but can be controlled to a value in the range of 1.48 to 1.63.

Therefore, in order to adjust the refractive index of the modified polysilazane layer to a value in the range of 1.48 to 1.63, it is preferable to adjust the silicon amount in the modified polysilazane layer measured by XPS to a value in the range of, more preferably 36 to 48 mol %, further preferably 37 to 42 mol %, even more preferably 38 to 41 mol %, with respect to the overall amount.

(3)-2 Oxygen Amount

The oxygen amount (O) measured by XPS is preferably a value in the range of 0.1 to 58 mol % with respect to the overall amount (100 mol %), wherein the overall amount is the total amount of the silicon amount (Si), oxygen amount (O) and nitrogen amount (N).

The reason is that the refractive index can be within the above-mentioned predetermined range by controlling the oxygen amount in such way.

Furthermore, the reason is that a gas barrier film having more excellent gas barrier properties can be obtained in the case when a gas barrier layer is formed by a plasma ion implantation process.

Specifically, as show in characteristic curve B in FIG. 4, the refractive index of the modified polysilazane layer tends to decrease in accordance with the increase in the oxygen amount (O) in the modified polysilazane layer.

More specifically, when the oxygen amount is a valueless than 0.001 mol %, the refractive index of the modified polysilazane layer excessively increases and the refractive index thereof is difficult to be controlled to a value of 1.63 or less in some cases.

On the other hand, when the oxygen amount exceeds 58 mol %, the refractive index of the modified polysilazane layer excessively decreases and the refractive index thereof is difficult to be controlled to a value of 1.48 or more in some cases.

Therefore, in order for the modified polysilazane layer to have a refractive index of a value in the range of 1.48 to 1.63, the oxygen amount in the modified polysilazane layer measured by XPS is a value in the range of, more preferably 15 to 57 mol %, further preferably 28 to 56 mol %, even more preferably 30 to 55 mol %, with respect to the overall amount.

(3)-3 Nitrogen Amount

The nitrogen amount (N) in the modified polysilazane layer measured by XPS is preferably a value in the range of 7 to 50 mol % with respect to the overall amount (100 mol %), wherein the overall amount is the total amount of the silicon amount (Si), oxygen amount (O) and nitrogen amount (N).

The reason is that the refractive index can be within the above-mentioned predetermined range by controlling the nitrogen amount in such way.

Furthermore, the reason is that a gas barrier film having more excellent gas barrier properties can be obtained in the case when a gas barrier layer is formed by a plasma ion implantation process.

Specifically, as shown in characteristic curve C in FIG. 4, the refractive index of the modified polysilazane layer tends to increase in accordance with the increase in the nitrogen amount (N) in the modified polysilazane layer.

More specifically, when the nitrogen amount is a value less than 7 mol %, the refractive index of the modified polysilazane layer excessively decreases and the refractive index thereof is difficult to be controlled to a value of 1.48 or more in some cases.

On the other hand, when the nitrogen amount is a value more than 50 mol %, the refractive index of the modified polysilazane layer excessively increases and the refractive index thereof is difficult to be controlled to a value of 1.63 or less in some cases.

Therefore, in order for the modified polysilazane layer to have a refractive index of a value in the range of 1.48 to 1.63, the nitrogen amount in the modified polysilazane layer measured by XPS is a value in the range of, more preferably 9 to 28 mol %, further preferably 10 to 20 mol %, with respect to the overall amount.

(4) Form

The modified polysilazane layer in the present invention may be single-layered or multi-layered.

Hereinafter the respective cases will be explained.

(4)-1 Single-Layered

Figure 5A:
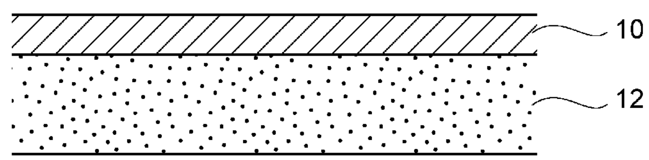
FIG. 5A is a drawing provided for explaining a single-layered modified polysilazane layer.

FIG. 5A shows an embodiment in which a single-layered modified polysilazane layer 10 is formed on a substrate 12 for which gas barrier properties are desired.

If the modified polysilazane layer is single-layered as mentioned above, in the case when the modified polysilazane layer is formed into a gas barrier layer by ion implantation, the obtained gas barrier film is easily thinned and made transparent, and fine flexibility (bending resistance) and the like are easily obtained.

The substrate for forming the single-layered modified polysilazane layer will be mentioned below.

(4)-2 Multi-Layered

Figure 5B:
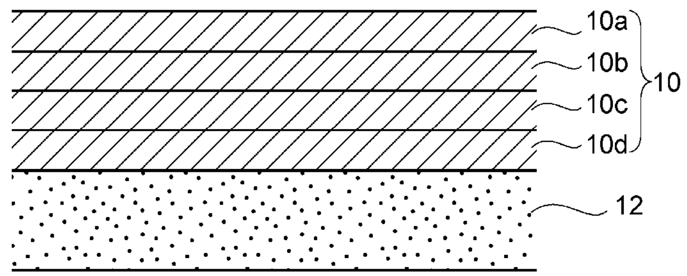
FIG. 5B is a drawing provided for explaining a multi-layered modified polysilazane layer.

FIG. 5B shows an embodiment in which a multi-layered modified polysilazane layer 10 comprising a substrate 12 for which gas barrier properties are desired and plural modified polysilazane layers (10*a*, 10*b*, 10*c* and 10*d*) formed thereon is formed.

If the modified polysilazane layer is multi-layered as mentioned above, the gas barrier properties of the entirety of the gas barrier film can be adjusted more successfully and the adhesion with the substrate and durability can also be improved.

Furthermore, in the case when the modified polysilazane layer is multi-layered, it is preferable that all of the plural modified polysilazane layers satisfy the ranges of the thickness and refractive index defined by the present invention, but it is also preferable that at least the modified polysilazane layer as the outermost layer satisfies the ranges of the thickness and refractive index defined by the present invention.

By this way, as mentioned below, a gas barrier film having predetermined gas barrier properties can be obtained by subjecting the modified polysilazane layer as the outermost layer to a plasma ion implantation process.

Although a multi-layered polysilazane layer in which four modified polysilazane layers are formed is exemplified in FIG. 5B, it is nothing to say that the modified polysilazane layer may be multi-layered other than four-layered.

(4)-3 Other Layers

As shown in FIGS. 5A and 5B, the modified polysilazane layer 10 is formed on the substrate 12.

At this time, it is also preferable to dispose the modified polysilazane layer 10 on at least one surface of the substrate 12 through a primer layer.

The reason is that the adhesion between the substrate and modified polysilazane layer can be improved by disposing the primer layer.

Examples of such primer layer may include primer layers formed of a silane coupling agent, an urethane resin, an epoxy resin, a polyester resin and the like.

Alternatively, the modified polysilazane layer may be of a form further comprising other layers.

Examples of such other layers may include inorganic thin film layers (inorganic oxide layers, inorganic nitride layers, inorganic carbide layers, inorganic sulfide layers, inorganic oxidized nitride layers, inorganic oxidized carbide layers, inorganic nitridized carbide layers, inorganic oxidized nitridized carbide layers and the like), electroconductive layers (metal layers, alloy layers, metal oxide layers, electroconductive compound layers and the like), shock absorbing layers (acrylic resin layers, urethane resin layers, silicone resin layers, olefin resin layers, rubber material layers and the like), decoration layers, printing layers and the like, alone or in a combination of two or more.

Specifically, by disposing an inorganic thin film, the gas barrier properties of the gas barrier layer obtained from the modified polysilazane layer can further be improved.

Furthermore, by disposing an electroconductive layer, electroconductivity can be imparted to the gas barrier layer obtained from the modified polysilazane layer.

Furthermore, by disposing a shock absorbing layer, the gas barrier layer obtained from the modified polysilazane layer can be protected against shock.

Furthermore, by disposing a decoration layer or a printing layer, decorativity can be imparted to the gas barrier layer obtained from the modified polysilazane layer.

2. Substrate

The kind of the substrate is not specifically limited, and examples may include glass plates, ceramic plates, thermoplastic resin films (polyester films, polyolefin films, polycarbonate films, polyimide films, polyamide films, polyamideimide films, polyphenylene ether films, polyether ketone films, polyether ether ketone films, polysulfone films, polyethersulfone films, polyphenylenesulfide films, polyarylate films, acrylic resin films, cycloolefin polymer films, aromatic polymer films and the like), thermosetting resin films (epoxy resin films, silicone resin films, phenol resin films and the like), and photocurable resin films (photocurable acrylic resin films, photocurable urethane resin films, photocurable epoxy resin films and the like), and the like, alone or in combination of two or more.

The thickness of the substrate is also not specifically limited, and is generally a value in the range of, preferably 0.5 to 1,000 μm, more preferably 1 to 300 μm, and further preferably 10 to 100 μm.

Among the above-mentioned films, polyester films, polyamide films, polysulfone films, polyethersulfone films, polyphenylenesulfide films, polyarylate films or cycloolefin polymer films are preferable since these have excellent transparency and general versatility, and polyester films, polyamide films or cycloolefin polymer films are more preferable.

Specific examples of the polyester films may include films formed of polyethylene telephthalate, polybutylene telephthalate, polyethylene naphthalate, polyarylate and the like.

Specific examples of the polyamide films may include films formed of wholly aromatic polyamides, nylon 6, nylon 66, nylon copolymers and the like.

Examples of the cycloolefin polymer films may include films formed of norbornene polymers, monocyclic cyclic olefin polymers, cyclic conjugate diene polymers, vinyl alicyclic hydrocarbon polymers, and hydrogenated products thereof, and the like, and more specific examples may include APEL (an ethylene-cycloolefin copolymer manufactured by Mitsui Chemicals, Inc.), ARTON (a norbornene polymer manufactured by JSR Corporation), ZEONOA (a norbornene polymer manufactured by Zeon Corporation) and the like.

[Second Embodiment]

The second embodiment is a method for producing a gas barrier film using a modified polysilazane film comprising a substrate and a modified polysilazane layer formed thereon, comprising the following steps (1) to (3).

(1) a polysilazane layer forming step, comprising forming a polysilazane layer on a substrate;

(2) an intermediate treatment step, comprising heat-treating the obtained polysilazane layer to give a modified polysilazane layer having a thickness of a value in the range of 10 to 500 nm and a refractive index of a value in the range of 1.48 to 1.63 to thereby give a modified polysilazane film as an intermediate material;

(3) a plasma ion implantation step, comprising conducting a plasma ion implantation process into the modified polysilazane layer of the obtained modified polysilazane film to form the modified polysilazane layer into a gas barrier layer to thereby give a gas barrier film comprising the substrate and the gas barrier layer formed thereon.

1. Step (1)

Figure 6A:
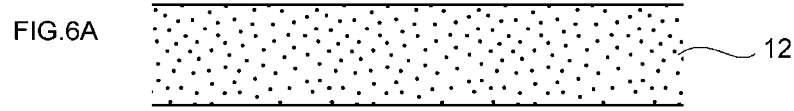
FIGS. 6A to 6E are drawings provided for explaining the method for producing a gas barrier film of the present invention.
Figure 6B:
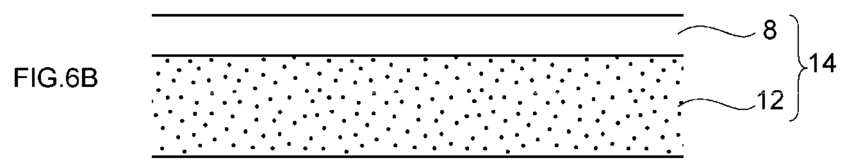

The polysilazane layer forming step as step (1) is a step in which a substrate 12 for which gas barrier properties are desired is prepared as shown in FIG. 6A, and a polysilazane layer 8 is formed on the substrate 12 as shown in FIG. 6B to give a polysilazane film 14 as a starting material.

(1) Polysilazane Compound

The polysilazane compound used for forming the polysilazane layer in the first step is a polymer compound having a repeating unit comprising an —Si—N-bond (silazane bond) in the molecule.

Specifically, a compound having a repeating unit represented by the following general formula (1) is preferable.

Although the number average molecular weight of the polysilazane compound used is not specifically limited, it is preferably of a value in the range of 100 to 50,000.

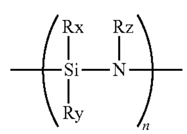

(1)

(Wherein in the general formula (1), Rx, Ry and Rz each independently represents a hydrogen atom, or a non-hydrolysable group such as an alkyl group being unsubstituted or having substituent(s), a cycloalkyl group being unsubstituted or having substituent(s), an alkenyl group being unsubstituted or having substituent(s), an aryl group being unsubstituted or having substituent(s), or an alkylsilyl group, and the subscript n represents an arbitrary natural number.)

Examples of the alkyl group in the above-mentioned alkyl group being unsubstituted or having substituent(s) may include alkyl groups having a carbon number of 1 to 10 such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group and an n-octyl group.

Examples of the cycloalkyl group in the above-mentioned cycloalkyl group being unsubstituted or having substituent(s) may include cycloalkyl groups having a carbon number of 3 to 10 such as a cyclobutyl group, a cyclopentyl group, a cyclohexyl group and a cyclohexyl group.

Examples of the alkenyl group in the above-mentioned alkenyl group being unsubstituted or having substituent(s) may include alkenyl groups having a carbon number of 2 to 10 such as a vinyl group, an 1-propenyl group, a 2-propenyl group, a 1-butenyl group, a 2-butenyl group and a 3-butenyl group.

Examples of the substituents for the above-mentioned alkyl group, cycloalkyl group and alkenyl group may include halogen atoms such as a chlorine atom, a bromine atom and an iodine atom; a hydroxyl group; a thiol group; an epoxy group; a glycidoxy group; a (meth)acryloyloxy group; aryl groups being unsubstituted or having substituent(s) such as a phenyl group, a 4-methylphenyl group and a 4-chlorophenyl group; and the like.

Examples of the above-mentioned aryl group being unsubstituted or having substituent(s) may include aryl groups having a carbon number of 6 to 10 such as a phenyl group, a 1-naphthyl group and a 2-naphthyl group.

Examples of the substituents for the above-mentioned aryl group may include halogen atoms such as a fluorine atom, a chlorine atom, a bromine atom and an iodine atom; alkyl groups having a carbon number of 1 to 6 such as a methyl group and an ethyl group; alkoxy groups having a carbon number of 1 to 6 such as a methoxy group and an ethoxy group; a nitro group; a cyano group; a hydroxyl group; a thiol group; an epoxy group; a glycidoxy group; a (meta) acryloyloxy group; aryl groups being unsubstituted or having substituent (s) such as a phenyl group, a 4-methylphenyl group and a 4-chlorophenyl group; and the like.

Examples of the above-mentioned alkylsilyl group may include a trimethylsilyl group, a triethylsilyl group, a triisopropylsilyl group, a trit-butylsilyl group, a methyldiethylsilyl group, a dimethylsilyl group, a diethylsilyl group, a methylsilyl group, an ethylsilyl group and the like.

Among the above-mentioned groups, Rx, Ry and Rz are preferably a hydrogen atom, an alkyl group having a carbon number of 1 to 6 or a phenyl group, specifically preferably a hydrogen atom.

Furthermore, the polysilazane compound having a repeating unit represented by the above-mentioned general formula (1) is preferably an inorganic polysilazane compound wherein Rx, Ry and Rz are all hydrogen atoms.

Such inorganic polysilazane compound may include compounds comprising the structures represented by the following general formulas (2), (3) and (4).

Specifically, a perhydropolysilazane having a straight chain structure having a repeating unit represented by the following general formula (2), and having 3 to 10 $SiH_3$ groups in one molecule and a number average molecular weight of a value in the range of 690 to 2,000 is exemplified.

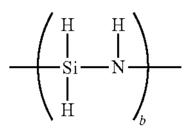

(2)

(Wherein in the general formula (2), the subscript b represents an arbitrary natural number.)

Furthermore, a perhydropolysilazane having a straight chain structure and a branched structure having a repeating unit represented by the following general formula (3) can be exemplified.

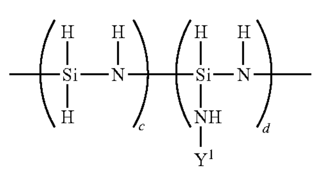

(3)

(Wherein in the general formula (3), $Y^1$ is a hydrogen atom or a group represented by the following general formula (3'), and subscripts c and d each represents an arbitrary natural number.)

(3')

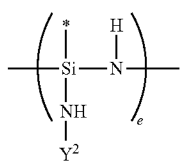

(Wherein in the general formula (3'), $Y^2$ is a hydrogen atom or a group represented by the following general formula (3'), the subscript e represents an arbitrary natural number, and * represents a bonding position.)

Furthermore, a perhydropolysilazane having a straight chain structure, a branched structure and a cyclic structure in the molecule having a perhydropolysilazane structure represented by the following formula (4) may be exemplified.

(4)

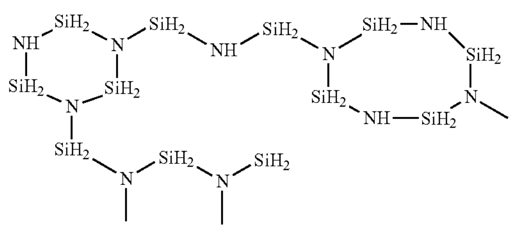

Furthermore, the polysilazane compound having a repeating unit represented by the above-mentioned general formula (1) may be an organic polysilazane compound wherein at least one of Rx, Ry and Rz is not a hydrogen atom.

Such organic polysilazane compound may include compounds comprising the structures represented by the following general formulas (5) to (7) and (9) and the following formula (8).

Specifically, a compound having a structure represented by the following general formula (5) as a repeating unit and mainly has a cyclic structure having a polymerization degree of 3 to 5 may be exemplified.

—(Rx'SiHNH)— (5)

(Wherein in the general formula (5), Rx' represents an alkyl group being unsubstituted or having substituent(s), a cycloalkyl group being unsubstituted or having substituent(s), an alkenyl group being unsubstituted or having substituent(s), an aryl group being unsubstituted or having substituent(s), or an alkylsilyl group, and the same applies to the following general formulas.)

Furthermore, a compound having a structure represented by the following general formula (6) as a repeating unit and mainly has a cyclic structure having a polymerization degree of 3 to 5 may be exemplified.

—(Rx'SiHNRz')- (6)

(Wherein in the general formula (6), Rz' represents an alkyl group being unsubstituted or having substituent(s), a cycloalkyl group being unsubstituted or having substituent(s), or an alkylsilyl group.)

Furthermore, a compound having a structure represented by the following general formula (7) as a repeating unit and mainly has a cyclic structure having a polymerization degree of 3 to 5 may be exemplified.

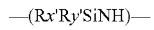

—(Rx'Ry'SiNH)— (7)

(Wherein in the general formula (7), Ry' represents an alkyl group being unsubstituted or having substituent(s), a cycloalkyl group being unsubstituted or having substituent(s), an alkenyl group being unsubstituted or having substituent(s), an aryl group being unsubstituted or having substituent(s), or an alkylsilyl group.)

Furthermore, a polyorgano(hydro)silazane compound having a structure represented by the following formula (8) in the molecule may be exemplified.

(8)

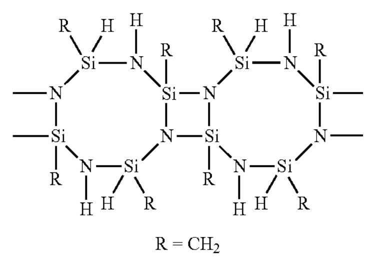

Furthermore, a polysilazane compound having a repeating structure represented by the following general formula (9) may be exemplified.

(9)

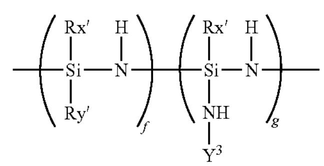

(Wherein in the general formula (9), $Y^3$ is a hydrogen atom or a group represented by the following general formula (9'), and the subscripts f and g each represents an arbitrary natural number.)

(9')

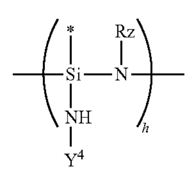

(Wherein in the general formula (9'), $Y^4$ is a hydrogen atom or a group represented by the following general formula (9'), the subscript h represents an arbitrary natural number, and * represents a bonding position.)

The above-mentioned organic polysilazane compounds can be produced by conventional methods.

For example, the compounds can be obtained by reacting ammonia or a primary amine with a reaction product of a halogenosilane compound being unsubstituted or having substituent(s) represented by the following general formula (10) and a secondary amine.

The secondary amine, ammonia and primary amine used can be suitably selected depending on the structure of the intended polysilazane compound.

$$R^1_{4-m}SiX_m \quad (10)$$

(Wherein in the general formula (10), X represents a halogen atom, and $R^1$ is any of the substituents of the above-mentioned Rx, Ry, Rz, Rx', Ry' and Rz'.)

Furthermore, in the present invention, as the polysilazane compound, for example, a polymetallosilazane containing a metal atom (wherein the metal atom may form a part of the cross-linked structure), a polysiloxazane having repeating units represented by $[(SiH_2)_i(NH)_j]$ and $[(SiH_2)_kO]$ (wherein the subscripts i, j and k are each independently 1, 2 or 3), a polyborosilazane that is produced by reacting a polysilazane with a boron compound, a polymetallosilazane that is produced by reacting a polysilazane with a metal alkoxide, an inorganic silazane highpolymer and a modified polysilazane, a copolymerized silazane that is formed by introducing an organic component into a polysilazane, and a low temperature ceramized polysilazane that is formed by attaching or adding a catalytic compound for promoting ceramization to a polysilazane can be used.

Furthermore, a silicon alkoxide-added polysilazane, a glycidol-added polysilazane, an acetylacetonato complex-added polysilazane, a metal carboxylic acid salt-added polysilazane and the like can be used.

Furthermore, examples may also include polysilazane compositions that are formed by adding amines and/or acids to the above-mentioned polysilazane compounds, compounds that are obtained by adding alcohols such as methanol or hexamethyldisilazane to the terminal N-atom of a perhydropolysilazane, and the like.

As the polysilazane compound, commercial products that are commercially available as glass coating agents and the like can be directly used.

Although various polysilazane compounds are exemplified above, it is specifically preferable to use a perhydropolysilazane.

The reason is that, when a perhydropolysilazane is used, the refractive index of the modified polysilazane layer is easily controlled, and a gas barrier film having more excellent gas barrier properties and mechanical properties can be obtained when the perhydropolysilazane is formed into a gas barrier layer by a plasma ion implantation process.

(2) Step of Forming Polysilazane Layer

Subsequently, as shown in FIG. 6B, the polysilazane compound as prepared is applied onto the substrate 12 to form a polysilazane layer 8 in this step.

The kind of the substrate 12 is not specifically limited, and is omitted here since it is described in the first embodiment.

Various known methods can also be used for the method for forming the polysilazane layer 8.

Examples may include a screen printing process, a knife coat process, a roll coat process, a die coat process, an inkjet process, a spin coat process and the like, alone or in combination of two or more.

In order to form a polysilazane layer having an even thickness, it is preferable to form the polysilazane layer by incorporating an organic solvent or water in a polysilazane compound to form a polysilazane compound-containing liquid substance, and applying the liquid substance onto the substrate and the like.

The thickness of the substrate is also not specifically limited, and is generally a value in the range of, preferably 0.5 to 1,000 μm, more preferably 1 to 300 μm, and further preferably 10 to 100 μm.

2. Step (2)

Figure 6C:
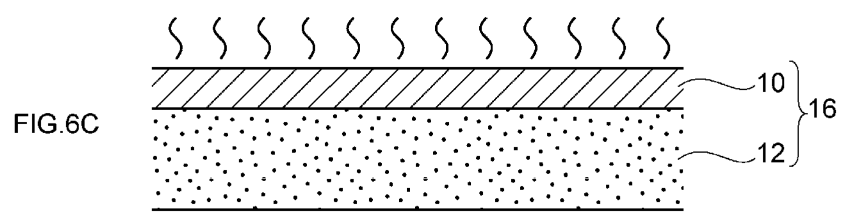

As shown in FIG. 6C, the intermediate treatment step as the step (2) is a step in which the polysilazane layer 8 formed in the step (1) is heat-treated under predetermined conditions to form a modified polysilazane layer 10 having predetermined thickness and refractive index to thereby give a modified polysilazane film 16 as an intermediate material.

(1) Heat Treatment

Furthermore, as the conditions for the heat treatment of the polysilazane layer, it is preferable that the heating temperature is a value in the range of 60 to 140° C., and the heat treatment time is a value in the range of 30 seconds to 60 minutes.

The reason is that the refractive index of the modified polysilazane layer is easily adjusted without damaging the substrate and the like by such heat treatment conditions, and thus a gas barrier film having extremely excellent gas barrier properties can be stably obtained in the case when the modified polysilazane layer is formed into a gas barrier layer.

Therefore, as the conditions for the heat treatment of the polysilazane layer, it is more preferable that the heating temperature is adjusted to a value in the range of 70 to 130° C. and the heat treatment time is adjusted to a value in the range of 1 to 50 minutes, and it is further preferable that the heating temperature is adjusted to a value in the range of 80 to 120° C. and the heat treatment time is adjusted to a value in the range of 2 to 30 minutes.

Furthermore, it is also preferable to subject a laminate containing the polysilazane layer to a heat treatment and then subjected to an air-conditioning treatment.

The reason is that the value of the refractive index can be gradually decreased by conducting such additional treatment, and thus gas barrier properties with small variability can be obtained.

By this way, a gas barrier film having excellent gas barrier properties, and further having a high total light transmittance and a low yellow tinge can be obtained.

As the air-conditioning treatment, for example, it is preferable to leave the laminate comprising the polysilazane layer under atmospheric conditions of a for 24 to temperature at 15 to 35° C. under a relative humidity of 480 hours.

(2) Modified Polysilazane Layer

Since the modified polysilazane layer obtained by conducting a heat treatment can be a similar modified polysilazane layer having a similar form to those explained in the first embodiment, a repetitive explanation is omitted here.

3. Step (3)

(1) Basic Method

Figure 6D:
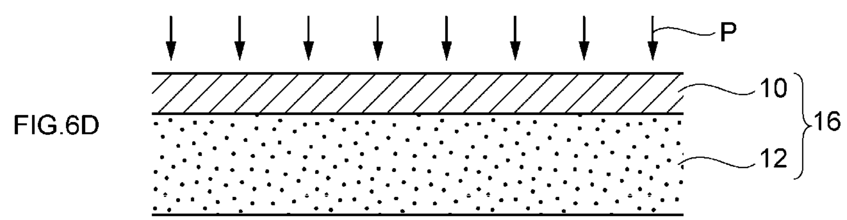
Figure 6E:
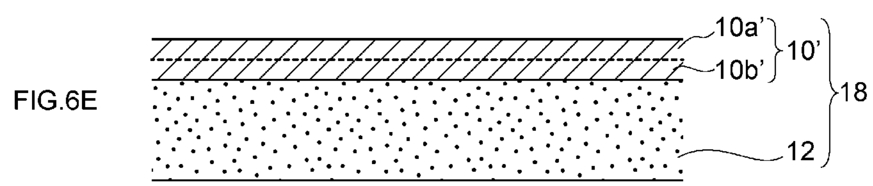

As shown in FIG. 6D, the step (3) is a step of obtaining a gas barrier film 18 by conducting a plasma ion implantation process into the modified polysilazane layer 10 to thereby implantations that are present in plasma generated by using an outer electrical field to form a gas barrier layer 10' as shown in FIG. 6E.

More specifically, a basic method of the plasma ion implantation process comprises generating plasma under an atmosphere containing a plasma-generating gas such as a rare gas, and applying a negative high voltage pulse to thereby inject the ions in the plasma (positive ions) into the surface of the modified polysilazane layer.

In FIG. 6E, in order to distinguish an ion-implantation area 10$a'$ where the ions have been injected from other non-ion-injected area 10$b'$, a boundary is shown by drawing a dotted line between these areas.

As the plasma ion implantation process, a method comprising injecting ions that are present in plasma generated by using an outer electrical field into the modified polysilazane layer, or a method comprising injecting ions that are present in plasma generated by using only an electrical field by a negative high voltage pulse applied to the modified polysilazane layer, without using an outer electrical field, into the modified polysilazane layer, is preferable.

Furthermore, a known plasma ion implantation apparatus can be used in the implantation of the ions in the plasma into the modified polysilazane layer.

Figure 7:
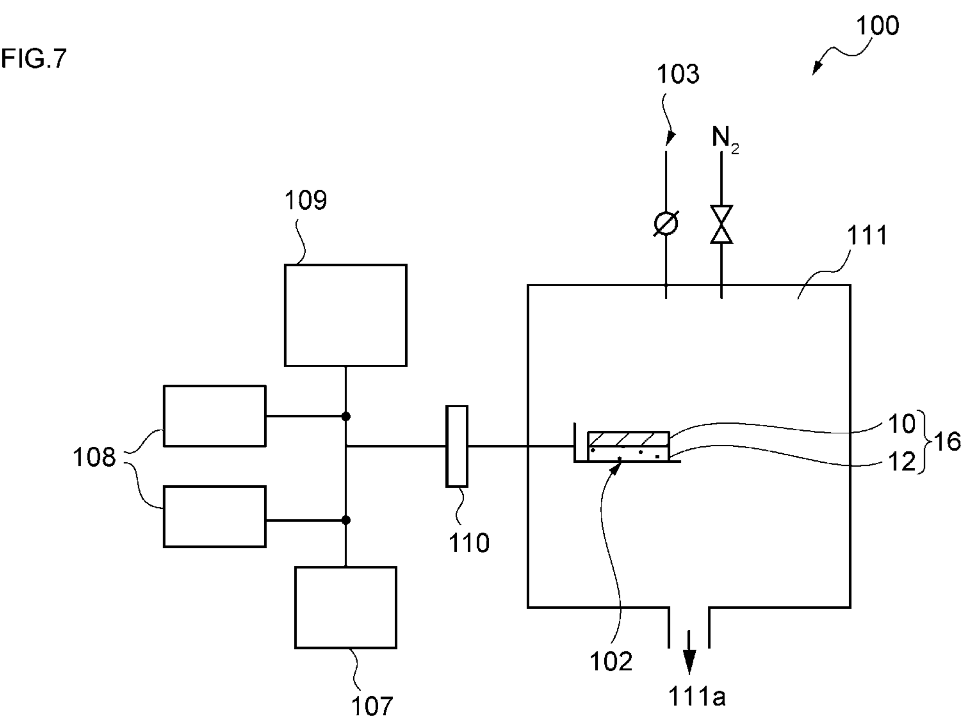
FIG. 7 is a drawing provided for explaining an example of an ion implantation apparatus.
Figure 8A:
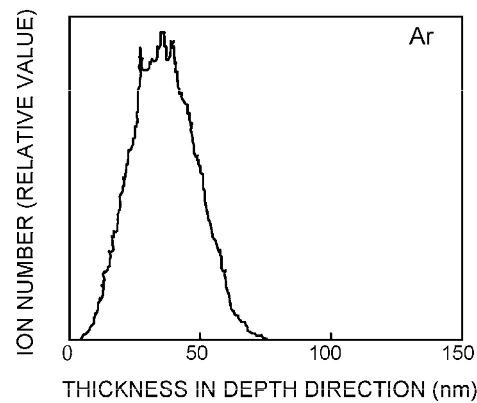
FIGS. 8A to 8F are drawings provided for explaining the relationships between the thicknesses in depth direction (nm) in Ar, Kr, He, N, Ne and O and the ion numbers by Monte-Carlo Simulation.
Figure 8D:
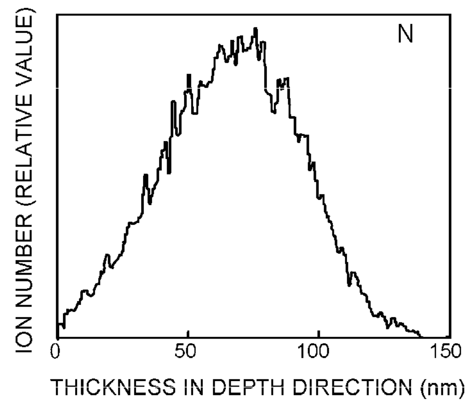
Figure 8B:
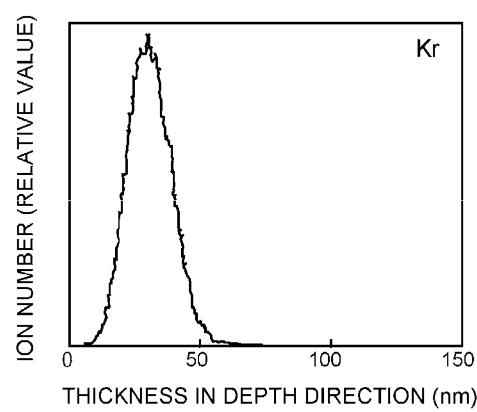
Figure 8E:
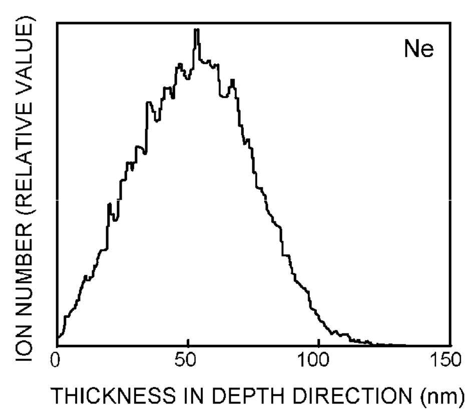
Figure 8C:
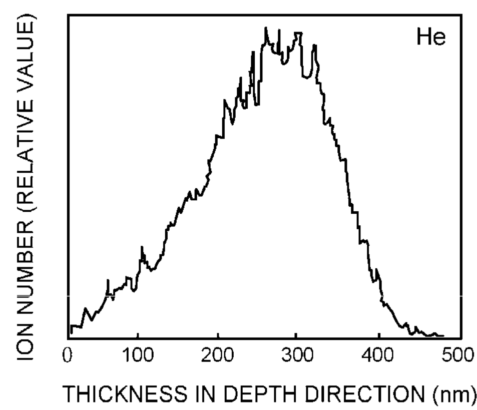
Figure 8F:
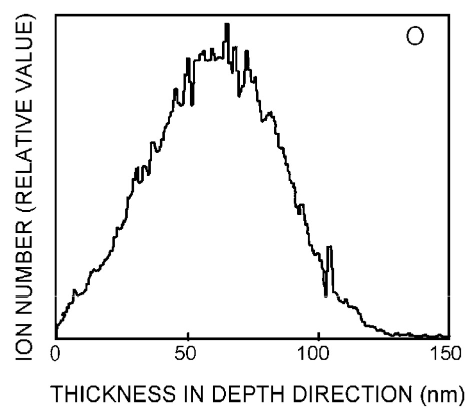

The outline of the plasma ion implantation process will be explained by exemplifying the plasma ion implantation apparatus 100 shown in FIG. 7.

Specifically, such plasma ion implantation apparatus 100 essentially comprises a vacuum chamber 111, a microwave power source (not depicted), a magnet coil (not depicted), a direct current application apparatus (pulse power source) 108 and a high-frequency pulse power source 109.

The vacuum chamber 111 is a container for disposing a modified polysilazane film 16 comprising the substrate 12 and the modified polysilazane layer 10 to be treated formed thereon, on a predetermined position of the inside of the chamber, and for injecting ions derived from a predetermined gas introduced from a gas introduction port 103. Furthermore, the vacuum chamber 111 comprises an exhaust hole 111*a* for discharging the air inside, the predetermined gas that has been introduced, and the like in the direction of the arrow.

The direct current application apparatus 108 is a direct current power source equipped with an oscilloscope 107, and is a pulse power source for applying a high voltage pulse to the modified polysilazane film 16 to be treated.

Therefore, the direct current application apparatus 108 is electrically connected to a conductor 102 on which the modified polysilazane film 16 as the object of the treatment is disposed.

Therefore, according to the plasma ion implantation apparatus 100 constituted in such way, plasma of the predetermined gas is generated around the conductor 102 and modified polysilazane film 16 by driving a microwave power source (electrode for plasma discharge) (not depicted) and a magnet coil (not depicted).

Subsequently, after a predetermined time has passed, the driving of the microwave power source (not depicted) and magnet coil (not depicted) is stopped and the direct current application apparatus 108 is driven, and thus a predetermined high voltage pulse (negative voltage) is applied to the modified polysilazane film 16 to be treated, through the high-voltage feedthrough 110 and conductor 102.

Therefore, ion species in the plasma (nitrogen ion and the like) are attracted by applying such high voltage pulse (negative voltage), and by injecting the ion species into the modified polysilazane layer 10 of the modified polysilazane film 16, a gas barrier film having a gas barrier layer comprising an ion implantation area, which is an ion-injected portion, on at least the surface thereof, can be formed.

In addition, although it is not depicted, in an implantation apparatus for continuously injecting plasma ions, it is preferable to drive the modified polysilazane film 16 to be rotated by using a motor or the like and sequentially inject plasma ions.

(2) Ion Species

Although the ion species to be introduced into the above-mentioned vacuum chamber and eventually injected into the modified polysilazane layer are not specifically limited, examples may include ions of rare gases such as argon, helium, neon, krypton and xenon; ions of fluorocarbons, hydrogen, nitrogen, oxygen, carbon dioxide, chlorine, fluorine, sulfur and the like; ions of alkane gases such as methane, ethane, propane, butane, pentane and hexane; ions of alkene gases such as ethylene, propylene, butene and pentene; ions of alkadiene gases such as pentadiene and butadiene; ions of alkyne gases such as acetylene and methylacetylene; ions of aromatic hydrocarbon gases such as benzene, toluene, xylene, indene, naphthalene and phenanthrene; ions of cycloalkane gases such as cyclopropane and cyclohexane; ions of cycloalkene gases such as cyclopentene and cyclohexene; ions of electroconductive metals such as gold, silver, copper, platinum, nickel, palladium, chromium, titanium, molybdenum, niobium, tantalum, tungsten and aluminum; ions of silane ($SiH_4$) or organic silicon compounds; and the like.

Among these, at least one ion species selected from the group consisting of hydrogen, nitrogen, oxygen, argon, helium, neon, xenon and krypton is preferable since ions can be injected more easily into a position at a predetermined depth of the modified polysilazane layer, and thus a gas barrier film having excellent gas barrier properties can be stably obtained even from a thin film.

In FIGS. 8A to 8F, the relationships between the thicknesses in depth direction (nm) of the modified polysilazane layer when argon (Ar), krypton (Kr), helium (He), nitrogen (N), neon (Ne) and oxygen (O) are respectively used as the ion species, and ion numbers calculated by Monte-Carlo Simulation (numerical analysis conducted by using random numbers).

As is understood from such FIGS. 8A to 8F, it was clarified that the variation in the ion numbers calculated by Monte-Carlo Simulation on the respective thicknesses in depth direction (nm) of the modified polysilazane layer is small, and thus ions can be injected into a position at a predetermined depth in the cases when argon (Ar), krypton (Kr), helium (He), nitrogen (N), neon (Ne) and oxygen (O) are respectively used, and thus these are preferable as ion species to be injected.

In addition, the ion species to be injected into a film-like polysilazane compound, i.e., a gas for ion implantation, also has a function as a plasma-generating gas.

(3) Plasma Ion Implantation Pressure

Furthermore, the pressure in the vacuum chamber during the ion implantation, i.e., the plasma ion implantation pressure is preferably a value in the range of 0.01 to 1 Pa.

The reason is that, when the pressure during such plasma ion implantation is in such a range, ions can be injected easily, efficiently and evenly, and thus a gas barrier film having bending resistance and gas barrier properties in combination can be efficiently formed.

Therefore, the plasma ion implantation pressure is more preferable a value in the range of 0.02 to 0.8 Pa, further preferable a value in the range of 0.03 to 0.6 Pa.

(4) Voltage Applied During Plasma Ion Implantation

Furthermore, the voltage applied during the ion implantation is preferably a value in the range of −1 kV to −50 kV.

The reason is that, when the ion implantation is conducted at such a voltage that the applied voltage is lower than −1 kV, the ion implantation amount (dose amount) may become insufficient, and thus a gas barrier film having desired gas barrier properties may not be obtained.

On the other hand, when the ion implantation is conducted at such a voltage that the applied voltage is higher than −50 kV, the film may be charged during the ion implantation, and drawbacks such as coloring of the film may occur, and thus a gas barrier film having desired gas barrier properties may not be obtained.

Figure 9:
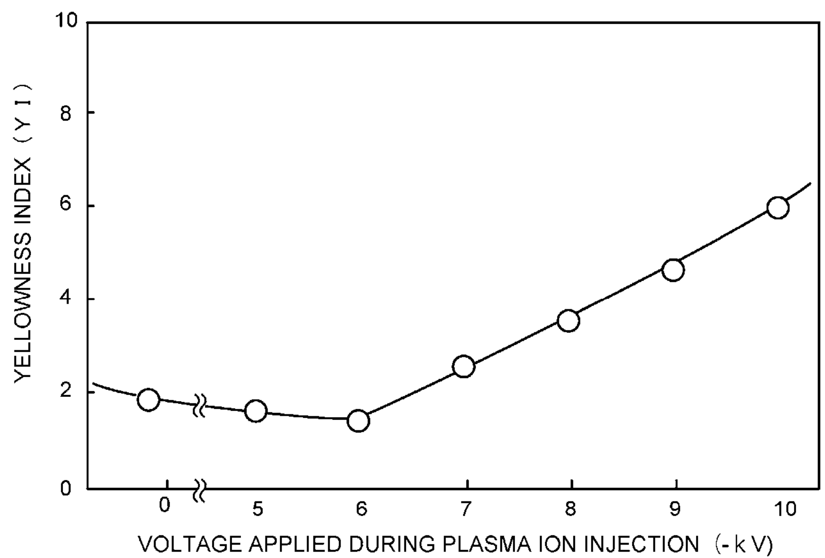
FIG. 9 is a drawing provided for explaining the relationship between the voltage applied during the plasma ion implantation (−kV) and the yellowness index (YI) of the gas barrier film.

FIG. 9 is a drawing showing the effects on the yellowness index (YI) of the gas barrier film in the cases when the voltage applied during the plasma ion implantation is 0 kv (i.e., before the plasma ion implantation) and when the voltage is varied in the range of −5 to −10 kV, under predetermined conditions.

According to such characteristic curve in FIG. 9, a tendency that the yellowness index (YI) of the obtained gas barrier film increases in approximately proportional to the voltage applied is observed.

Therefore, from the viewpoint of obtaining a gas barrier film having desired transparency without coloring, the voltage applied during the ion implantation is preferably a value in the range of −1 kV to −30 kV, more preferably a value in the range of −5 kV to −20 kV.

4. Other Step

A step of forming other layer wholly or partially on the front surface or back surface of the gas barrier film or on the boundary of the substrate and the modified polysilazane layer may be provided.

As the contents of the other layer, those described in the above-mentioned first embodiment may be exemplified.

EXAMPLES

The present invention will further be explained in detail with referring to Examples.

Example 1

1. Production of Gas Barrier Film (1) Step (1): Polysilazane Layer Forming Step

Using a spin coater (MS-A200 manufactured by Mikasa, rotational speed: 3000 rpm, rotational time: 30 seconds), a perhydropolysilazane-containing solution as a starting material (AQUAMICA NL110-20 manufactured by AZ Electronic Materials, solvent: xylene, concentration: 10% by weight) was applied onto a polyester film having a thickness of 25 μm as a substrate (PET26T600 manufactured by Mitsubishi Plastics, Inc.) to form a polysilazane layer.

(2) Step (2): Intermediate Treatment Step for Obtaining Modified Polysilazane Layer The obtained polysilazane layer was heat-treated under conditions of 120° C. and 2 minutes to give a modified polysilazane layer having a thickness of 150 nm and a refractive index of 1.5914.

(3) Step (3): Plasma Ion Implantation Step for Obtaining Gas Barrier Film

Subsequently, using a plasma ion implantation apparatus shown in FIG. 7 (RF power source: RF56000 manufactured by JEOL Ltd., high voltage pulse power source: PV-3-HSHV-0835 manufactured by Cup Kurita), plasma ion implantation was conducted on the obtained modified polysilazane layer under the following conditions to form a gas barrier film formed by forming a gas barrier layer on the substrate as a final article.

Plasma-generating gas: Ar
Gas flow amount: 100 sccm
Duty ratio: 0.5%
Voltage applied: −6 kV
RF power source: frequency 13.56 MHz, applied electrical power 1,000 W
Pressure in chamber: 0.2 Pa
Pulse width: 5 μsec
Treatment time (ion implantation time): 200 seconds 2. Evaluation of Modified Polysilazane Layer The modified polysilazane layer before the plasma ion implantation was evaluated as follows.

(1) XPS Analysis

Figure 10:
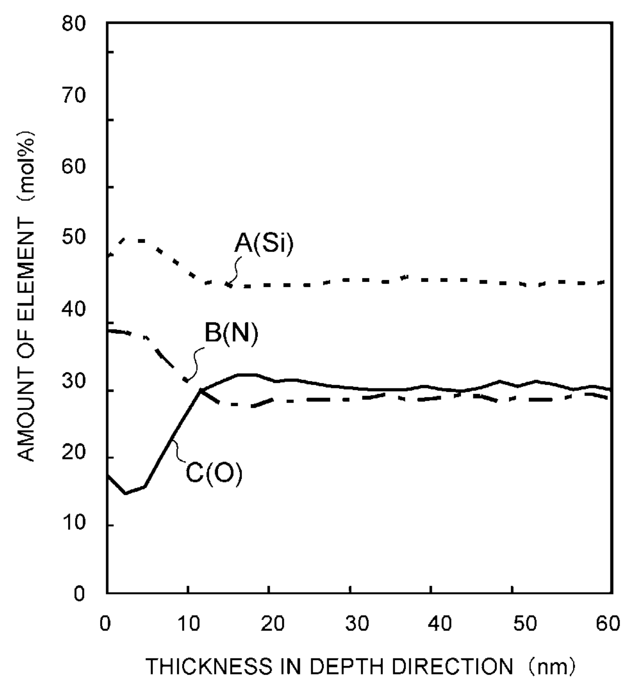
FIG. 10 is a drawing provided for explaining the relationships between the thickness in depth direction (nm) and the amounts of elements (the nitrogen amount, oxygen amount and silicon amount) measured by XPS in the modified polysilazane layer of Example 1 (refractive index: 1.5914)

Using an XPS analyzer (Quantum 2000 manufactured by Ulavac-Phi), an elemental analysis was conducted on the modified polysilazane layer. The obtained XPS chart is shown in FIG. 10.

Furthermore, the amounts of the respective elements in the case when the total amount of the silicon amount (Si), oxygen amount (0) and nitrogen amount (N) is considered as an overall amount (100 mol %) are shown in FIG. 2.

Each amount of element is an average value of the amounts of the element from the surface of the modified polysilazane layer to 60 nm toward the depth direction.

(2) Refractive Index

The refractive index of the obtained modified polysilazane layer was measured by using a spectroscopic ellipsometer (manufactured by J. A. Woolam Japan). The obtained result is shown in Table 1.

3. Evaluation of Gas Barrier Film

The gas barrier film that was finally obtained through the plasma ion implantation was evaluated as follows.

(1) Water Vapor Transmission Rate

Using a water vapor transmission rate measurement apparatus (AQUATRAN manufactured by MOCON), the water vapor transmission rate of the obtained gas barrier film under conditions of 40° C. and 90% RH (WVTR1) was measured. The obtained result is shown in Table 1.

(2) Total Light Transmittance

Using a turbidimeter (HAZE METER NDH5000 manufactured by Nippon Denshoku Industries Co., Ltd.), the total light transmittance (T.t.) of the obtained gas barrier film was measured in accordance with JIS K 7631-1. The obtained result is shown in Table 1.

(3) Yellowness Index and b* Value

Using a spectroscopic color difference meter (Spectro Color Meter SQ2000 manufactured by Nippon Denshoku Industries Co., Ltd.), the yellowness index (YI) and b* value (the value of the b* axis in the CIE1976L*a*b* color system) of the obtained gas barrier film were respectively measured. The obtained result is shown in Table 1.

YI and b* value are values that are respectively represented by the following formulas.

$$YI=100(1.28X-1.067Z)/Y$$

(Wherein X and Y are values of the tristimulus values in the X-Y-Z coordinate system of the sample measured by the color difference meter.)

$$b^*=200[(Y/Yn)^{1/3}-(Z/Zn)^{1/3}]$$

(Wherein Y and Z are values of the tristimulus values in the X-Y-Z coordinate system of the sample measured by the color difference meter, and Yn and Zn are values of the tristimulus values on the perfect reflecting diffuser.)

Example 2

In Example 2, a gas barrier film was produced and evaluated in a similar manner to Example 1, except that the polysilazane layer was heat-treated in step (2), and thereafter stored under an environment at 23° C. and 50% RH for 2 days as an air-conditioning treatment to give a modified polysilazane layer having a refractive index of 1.5505. The obtained results are shown in Tables 1 and 2.

Figure 11:
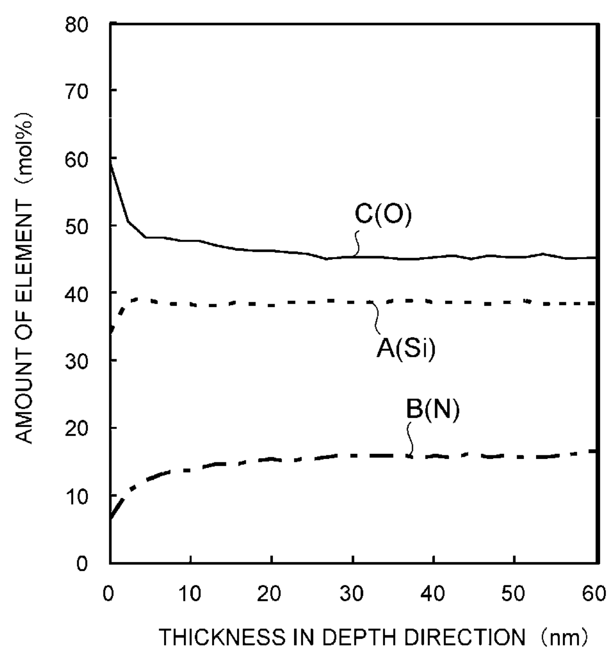
FIG. 11 is a drawing provided for explaining the relationships between the thickness in depth direction (nm) and the amounts of elements (the nitrogen amount, oxygen amount and silicon amount) measured by XPS in the modified polysilazane layer of Example 2 (refractive index: :1.5505)

An XPS chart for the modified polysilazane layer is shown in FIG. 11.

Example 3

In Example 3, a gas barrier film was produced and evaluated in a similar manner to Example 1, except that the polysilazane layer was heat-treated in step (2), and thereafter stored under an environment at 23° C. and 50% RH for 5 days as an air-conditioning treatment to give a modified polysilazane layer having a refractive index of 1.5249. The obtained results are shown in Tables 1 and 2.

Figure 12:
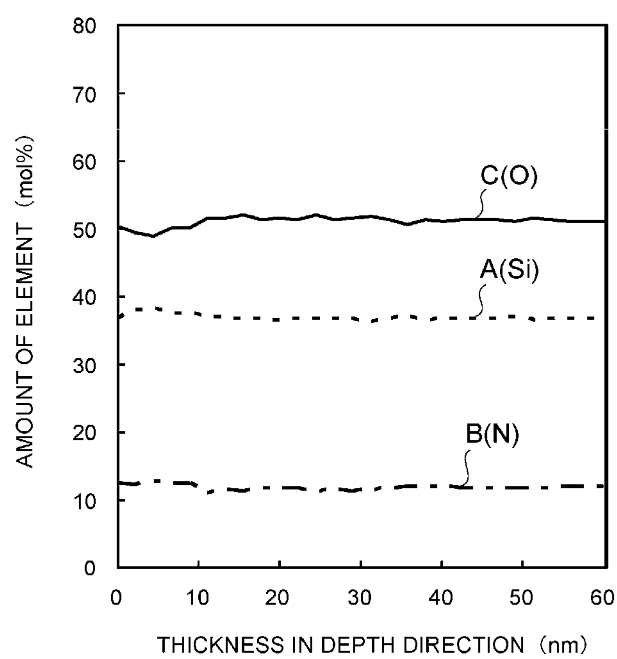
FIG. 12 is a drawing provided for explaining the relationships between the thickness in depth direction (nm) and the amounts of elements (the nitrogen amount, oxygen amount and silicon amount) measured by XPS in the modified polysilazane layer of Example 3 (refractive index: 1.5249)

An XPS chart for the modified polysilazane layer is shown in FIG. 12.

Example 4

In Example 4, a gas barrier film was produced and evaluated in a similar manner to Example 1, except that the polysilazane layer was heat-treated in step (2), and thereafter stored under an environment at 23° C. and 50% RH for 10 days as an air-conditioning treatment to give a modified polysilazane layer having a refractive index of 1.5045. The obtained results are shown in Tables 1 and 2.

Figure 13:
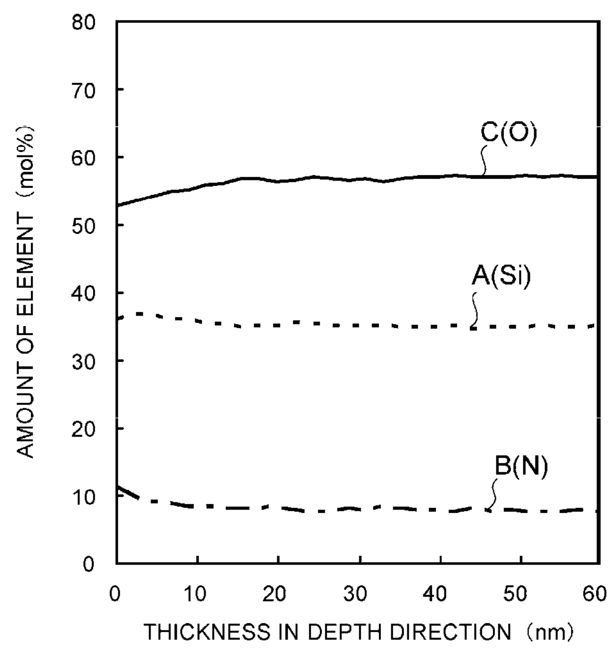
FIG. 13 is a drawing provided for explaining the relationships between the thickness in depth direction (nm) and the amounts of elements (the nitrogen amount, oxygen amount and silicon amount) measured by XPS in the modified polysilazane layer of Example 4 (refractive index: 1.5045)

An XPS chart for the modified polysilazane layer is shown in FIG. 13.

Comparative Example 1

In Comparative Example 1, a gas barrier film was produced and evaluated in a similar manner to Example 1, except that the polysilazane layer was heat-treated in step (2), and thereafter stored under an environment at 23° C. and 50% RH for 20 days as an air-conditioning treatment to give a modified polysilazane layer having a refractive index of 1.4601. The obtained results are shown in Tables 1 and 2.

Figure 14:
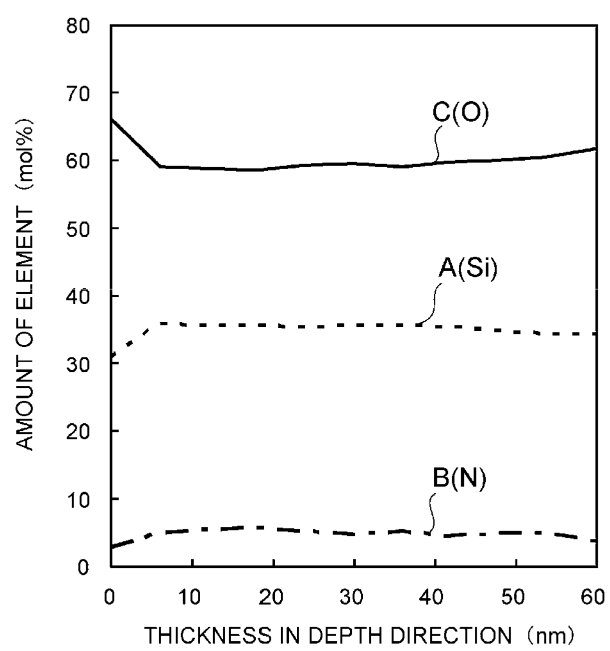
FIG. 14 is a drawing provided for explaining the relationships between the thickness in depth direction (nm) and the amounts of elements (the nitrogen amount, oxygen amount and silicon amount) measured by XPS in the modified polysilazane layer of Comparative Example 1 (refractive index: 1.4601).

An XPS chart for the modified polysilazane layer is shown in FIG. 14.

TABLE 1

| | Storage time after heating (day) | Refractive index of modified polysilazane layer | WVTR1 (g/(m$^2$day)) | Tt (%) | YI | b * |
|---|---|---|---|---|---|---|
| Example 1 | 0 | 1.5914 | 0.0030 | 90.21 | 3.59 | 1.83 |
| Example 2 | 2 | 1.5505 | 0.0210 | 91.15 | 1.93 | 1.02 |
| Example 3 | 5 | 1.5249 | 0.0201 | 91.55 | 1.56 | 0.69 |
| Example 4 | 10 | 1.5045 | 0.0193 | 91.88 | 0.96 | 0.43 |
| Comparative Example 1 | 20 | 1.4601 | 5.4100 | 92.50 | 0.30 | 0.11 |

TABLE 2

| | Nitrogen amount (mol %) | Oxygen amount (mol %) | Silicon amount (mol %) |
|---|---|---|---|
| Example 1 | 28.6 | 27.1 | 44.3 |
| Example 2 | 14.8 | 46.8 | 38.4 |
| Example 3 | 11.9 | 51.1 | 37.0 |
| Example 4 | 8.3 | 56.4 | 35.4 |
| Comparative Example 1 | 4.8 | 60.2 | 34.9 |

Example 5

In Example 5, a gas barrier film was produced and evaluated in a similar manner to Example 1, except that the thickness of the modified polysilazane layer was 50 nm.

Furthermore, in Examples 5 and 6 and Comparative Examples 2 and 3, as the evaluation of the water vapor transmission rate, a measurement intended for a gas barrier film after leaving for 150 hours under conditions of 60° C. and 90% RH (WVTR2) and a measurement intended for a gas barrier film after a bending test of the following content (WVTR3) were conducted, in addition to the measurement under conditions of 40° C. and 90% RH (WVTR1).

Furthermore, in the above-mentioned bending test, the presence or absence of crack on the bent portion was also evaluated. The obtained results are shown in Tables 3 and 4.

Each amount of element in the modified polysilazane layer of Example 5 is an average value of the amounts of the element from the surface of the modified polysilazane layer to 50 nm toward the depth direction.

The above-mentioned bending test was conducted as follows. Specifically, the obtained gas barrier film was folded in half at the center portion with the ion-injected surface facing toward, the gas barrier film in this state was passed through two rolls of a laminator (LAMIPACKER LPC1502 manufactured by Fujipla, Inc.) under conditions of a laminate velocity of 5 m/min and a temperature of 23° C., and the water vapor transmission rate (WVTR3) was measured. Furthermore, the bent part was observed by a microscope (magnification of enlargement: 1000-power) to confirm generation of crack.

Example 6

In Example 6, a gas barrier film was produced and evaluated in a similar manner to Example 5, except that the thickness of the modified polysilazane layer was 450 nm. The obtained results are shown in Tables 3 and 4.

Each amount of element in the modified polysilazane layer of Example 6 is an average value of the amounts of the element from the surface of the modified polysilazane layer to 60 nm toward the depth direction.

Comparative Example 2

In Comparative Example 2, a gas barrier film was produced and evaluated in a similar manner to Example 1, except that the thickness of the modified polysilazane layer was 600 nm. The obtained results are shown in Tables 3 and 4.

Each amount of element in the modified polysilazane layer of Comparative Example 2 is an average value of the amounts of the element from the surface of the modified polysilazane layer to 60 nm toward the depth direction.

Comparative Example 3

In Comparative Example 3, a gas barrier film was produced and evaluated in a similar manner to Example 1, except that the thickness of the modified polysilazane layer was 1,000 nm. The obtained results are shown in Tables 3 and 4.

Each amount of element in the modified polysilazane layer of Comparative Example 3 is an average value of the amounts of the element from the surface of the modified polysilazane layer to 60 nm toward the depth direction.

TABLE 3

| | Film thickness (nm) | Refractive index of modified polysilazane | WVTR1 ($g/(m^2day)$) | WVTR2 ($g/(m^2day)$) | WVTR3 ($g/(m^2day)$) | Tt (%) | YI | b * | Crack |
|---|---|---|---|---|---|---|---|---|---|
| Example 5 | 50 | 1.5914 | 0.0150 | 0.0152 | 0.0315 | 91.1 | 2.78 | 1.36 | Absent |
| Example 6 | 450 | 1.5914 | 0.0010 | 0.0015 | 0.0052 | 89.4 | 4.32 | 2.12 | Absent |
| Comparative Example 2 | 600 | 1.5914 | 0.0010 | 0.1205 | 0.2312 | 88.8 | 4.51 | 2.25 | Present |
| Comparative Example 3 | 1000 | 1.5914 | 0.0010 | 0.1142 | 0.2553 | 88.7 | 4.55 | 2.29 | Present |

TABLE 4

| | Nitrogen amount (mol %) | Oxygen amount (mol %) | Silicon amount (mol %) |
|---|---|---|---|
| Example 5 | 28.1 | 27.5 | 44.4 |
| Example 6 | 28.9 | 27.4 | 43.7 |
| Comparative Example 1 | 4.8 | 60.2 | 34.9 |
| Comparative Example 2 | 28.5 | 26.2 | 45.3 |
| Comparative Example 3 | 27.9 | 27.4 | 44.7 |

INDUSTRIAL APPLICABILITY

As is mentioned above in detail, according to the present invention, it has become possible to obtain a modified polysilazane film comprising a modified polysilazane layer having a thickness of a value in a predetermined range and a refractive index of a value in a predetermined range, and a substrate. Therefore, the modified polysilazane film of the present invention was effectively used in obtaining a gas barrier material by a plasma ion implantation process, and by this way, it has become possible to effectively obtain a gas barrier film having excellent gas barrier properties and the like by conducting plasma ion implantation on the modified polysilazane film.

Therefore, a gas barrier film obtained from the modified polysilazane film of the present invention as an intermediate material is expected to be used for various applications such as electrical products, electronic parts, PET bottles, packaging containers and glass containers, for which predetermined gas barrier properties are desired even they are thin films.

In addition, as long as similar operation and effect to that of the present invention can be obtained and predetermined gas barrier properties and the like can be obtained, even an aspect wherein the modified polysilazane film has a refined surface, or an aspect wherein the modified polysilazane film is cut into a predetermined shape, or an aspect wherein the modified polysilazane film is a mixture with other inorganic material or organic material is also encompassed in the scope of the modified polysilazane film of the present invention.

REFERENCE SIGNS LIST

8: polysilazane layer
10: modified polysilazane layer
**10*a***: modified polysilazane layer constituting multi-layered modified polysilazane layer,
**10*b***: modified polysilazane layer constituting multi-layered modified polysilazane layer
**10*c***: modified polysilazane layer constituting multi-layered modified polysilazane layer
**10*d***: modified polysilazane layer constituting multi-layered modified polysilazane layer
10': gas barrier layer
**10*a*'**: ion-injected area
**10*b*'**: non-ion-injected area
12: substrate
14: polysilazane film
16: modified polysilazane film
18: gas barrier film
100: plasma ion implantation apparatus
102: conductor
103: gas introduction port
107: oscilloscope
108: direct current application apparatus (pulse power source)
109: high-frequency pulse power source
110: high-voltage feedthrough
111: vacuum chamber
**111*a***: exhaust hole

What is claimed is:

1. A method for producing a gas barrier film using a modified polysilazane film comprising a substrate and a modified polysilazane layer formed thereon, comprising the following steps (1) to (3):

(1) a polysilazane layer forming step, comprising forming a polysilazane layer on the substrate, wherein a composition used for forming the polysilazane layer comprises a polysilazane compound having a repeating unit represented by the following general formula (1):

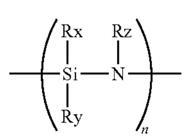

(1)

wherein in the general formula (1), Rx, Ry and Rz each independently represents a hydrogen atom, or a non-hydrolysable group selected from the group consisting of an alkyl group being unsubstituted or having at least one substituent, a cycloalkyl group being unsubstituted or having at least one substituent, an alkenyl group being unsubstituted or having at least one substituent, an aryl group being unsubstituted or having at least one substituent, and an alkylsilyl group, and the subscript n represents an arbitrary natural number;

(2) an intermediate treatment step, comprising heat-treating the polysilazane layer obtained in step (1) and then air-conditioning-treating the polysilazane layer at a temperature below that of the heat-treating to form the modified polysilazane layer having a thickness of a value in the range of 10 to 500 nm, a refractive index of a value in the range of 1.50 to 1.58, and an oxygen amount measured by X-ray Photoelectron Spectroscopy of a value in the range of 30 to 58 mol % with respect to the overall amount, taken as 100 mol %, wherein the overall amount is the total amount of the silicon amount, oxygen amount and nitrogen amount, to thereby give the modified polysilazane film as an intermediate material, wherein conditions for the heat treatment of the polysilazane layer include a heating temperature of 60 to 140° C. and a heat treatment time of a value in the range of 30 seconds to 60 minutes, and conditions for the air-conditioning treatment include leaving the polysilazane layer on the substrate under atmospheric conditions at a temperature of 15 to 35° C. under a relative humidity of 40 to 60% for 24 hours to 10 days; and (3) a plasma ion implantation step, comprising conducting a plasma ion implantation process into the modified polysilazane layer of the modified polysilazane film obtained in step (2) to form the modified polysilazane layer into a gas barrier layer to thereby give the gas barrier film comprising the substrate and the gas barrier layer formed thereon, wherein the plasma ion implantation process comprises generating plasma in an atmosphere containing a plasma generating gas, and applying a plasma ion implantation pressure adjusted to a value within the range of 0.01 Pa to 1 Pa and a negative high voltage pulse with an applied voltage adjusted to a value within the range of −1 kV to −50 kV.

2. The method for producing the gas barrier film according to claim 1, wherein oxygen, nitrogen, helium, argon, neon or krypton is used as the plasma ion in the step (3).

3. The method for producing the gas barrier film according to claim 1, wherein the modified polysilazane layer has the nitrogen amount measured by X-ray Photoelectron Spectroscopy of a value in the range of 7 to 20 mol % with respect to the overall amount, taken as 100 mol %, wherein the overall amount is the total amount of the silicon amount, oxygen amount and nitrogen amount.

4. The method for producing the gas barrier film according to claim 1, wherein the modified polysilazane layer has the silicon amount measured by X-ray Photoelectron Spectroscopy of a value in the range of 34 to 42 mol % with respect to the overall amount, taken as 100 mol %, wherein the overall amount is the total amount of the silicon amount, oxygen amount and nitrogen amount.

5. The method for producing a gas barrier film according to claim 1, wherein the polysilazane layer contains a perhydropolysilazane as a polysilazane compound.

6. The method for producing the gas barrier film according to claim 1, wherein the refractive index of the modified polysilazane layer is in the range of 1.50 to 1.55.

7. The method for producing the gas barrier film according to claim 1, wherein the substrate comprises at least one film selected from the group consisting of a thermoplastic resin film, a thermosetting resin film, and a photocured resin film.

8. The method for producing the gas barrier film according to claim 1, wherein the substrate comprises at least one film selected from the group consisting of a polyester film, a polyamide film, a polysulfone film, a polyethersulfone film, a polyphenylenesulfide film, a polyarylate film, and a cycloolefin polymer film.

9. The method for producing the gas barrier film according to claim 1, wherein the plasma ion implantation pressure is adjusted within the range of 0.02 Pa to 0.8 Pa.

10. The method for producing the gas barrier film according to claim 1, wherein the plasma ion implantation pressure is adjusted within the range of 0.03 Pa to 0.6 Pa.

11. The method for producing the gas barrier film according to claim 1, wherein the applied voltage is adjusted within the range of −1 kV to −30 kV.

12. The method for producing the gas barrier film according to claim 1, wherein the applied voltage is adjusted within the range of −5 kV to −20 kV.

13. The method for producing the gas barrier film according to claim 1, wherein the gas barrier film has a yellowness index (YI) adjusted to a value of 0.96 to 1.93.

14. The method for producing the gas barrier film according to claim 1, wherein the gas barrier film has a b* value adjusted to a value of 0.43 to 1.02.

* * * * *